(12) United States Patent
Zamer et al.

(10) Patent No.: US 10,147,102 B2
(45) Date of Patent: Dec. 4, 2018

(54) PERSON/GROUP CHECK-IN SYSTEM

(71) Applicant: PAYPAL, INC., San Jose, CA (US)

(72) Inventors: Kamal Zamer, Austin, TX (US); Matthew Scott Zises, San Jose, CA (US); David Edward Eramian, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 453 days.

(21) Appl. No.: 14/231,563

(22) Filed: Mar. 31, 2014

(65) Prior Publication Data

US 2015/0278830 A1 Oct. 1, 2015

(51) Int. Cl.
*G06Q 30/02* (2012.01)
*G06Q 50/00* (2012.01)
*G06Q 20/10* (2012.01)

(52) U.S. Cl.
CPC ......... *G06Q 30/0201* (2013.01); *G06Q 20/10* (2013.01); *G06Q 50/01* (2013.01)

(58) Field of Classification Search
CPC ..... G06Q 30/0201; G06Q 20/10; G06Q 50/01
See application file for complete search history.

(56) References Cited

U.S. PATENT DOCUMENTS

| | | | | |
|---|---|---|---|---|
| 8,301,502 | B2* | 10/2012 | Livnat | G06Q 10/10 705/21 |
| 8,571,999 | B2* | 10/2013 | Crawford | H04L 67/24 705/319 |
| 9,432,806 | B2* | 8/2016 | Zises | H04W 4/021 |
| 9,665,858 | B1* | 5/2017 | Kumar | G06Q 20/102 |
| 2007/0019616 | A1* | 1/2007 | Rantapuska | H04L 12/1822 370/352 |
| 2011/0045851 | A1* | 2/2011 | Maddox | H04W 4/06 455/466 |
| 2012/0265676 | A1* | 10/2012 | Gould | G06Q 20/102 705/39 |
| 2014/0244361 | A1* | 8/2014 | Zhang | G06Q 30/0204 705/7.33 |

(Continued)

OTHER PUBLICATIONS

Lutz et al., "12 Sneaky Ways that Big Retailers Track Your Every Move" Jan. 1, 2013. accessed at http://www.businessinsider.com/retail-tracking-Dec. 2012 (Year: 2013).*

(Continued)

*Primary Examiner* — Tiphany B Dickerson
(74) *Attorney, Agent, or Firm* — Haynes & Boone, LLP

(57) ABSTRACT

Systems and methods for person/group check-ins include a system provider device receiving from a first user device that is associated with a first user account a first check-in request to allow other user accounts to check-in to the first user account. The system provider device then receives from a second user device that is associated with a second user account a second check-in request to check-in to the first user account. The system provider device associates the first user account and the second user account in a database in response to receiving the second check-in request, and tracks an aggregate behavior associated with both the first user account and the second user account. The system provider device may then provide at least one alert that is based on the aggregate behavior.

20 Claims, 18 Drawing Sheets

(56) References Cited

U.S. PATENT DOCUMENTS

| | | | |
|---|---|---|---|
| 2014/0278513 A1* | 9/2014 | Prakash | G06F 19/345 705/2 |
| 2014/0278736 A1* | 9/2014 | Qaim-Maqami | G06Q 30/0201 705/7.29 |
| 2015/0193543 A1* | 7/2015 | Poliakov | G06Q 30/02 707/738 |
| 2015/0287006 A1* | 10/2015 | Hunter | G06Q 20/145 705/21 |
| 2015/0304369 A1* | 10/2015 | Sandholm | G06Q 10/10 715/753 |
| 2016/0335686 A1* | 11/2016 | AthuluruTlrumala | G06Q 30/0613 |

OTHER PUBLICATIONS

Ying, et al., 2012. Urban point-of-interest recommendation by mining user check-in behaviors. In Proceedings of the ACM SIGKDD International Workshop on Urban Computing (UrbComp '12). ACM, New York, NY, USA, 63-70. DOI=http://dx.doi.org/10.1145/2346496 (Year: 2012).*

* cited by examiner

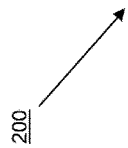
FIGURE 2a

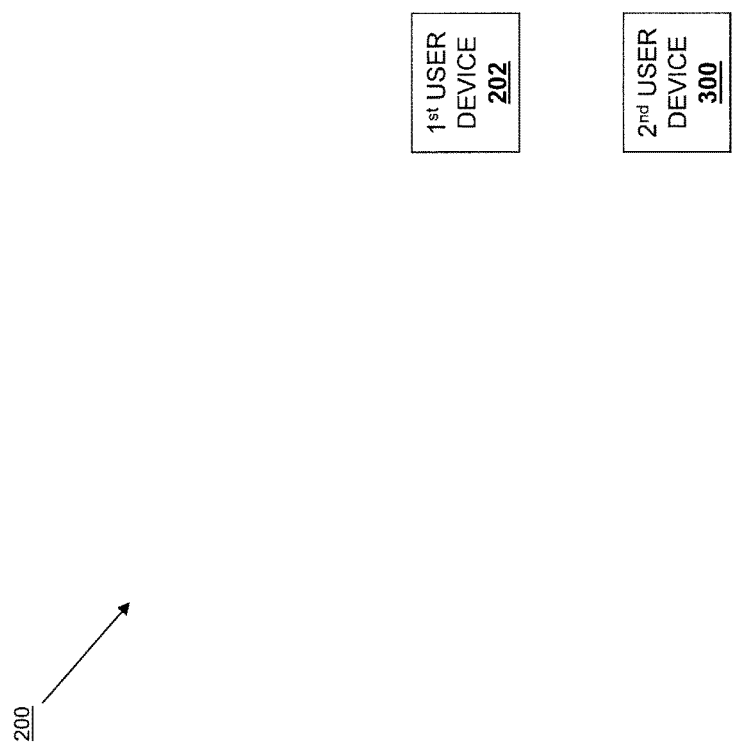

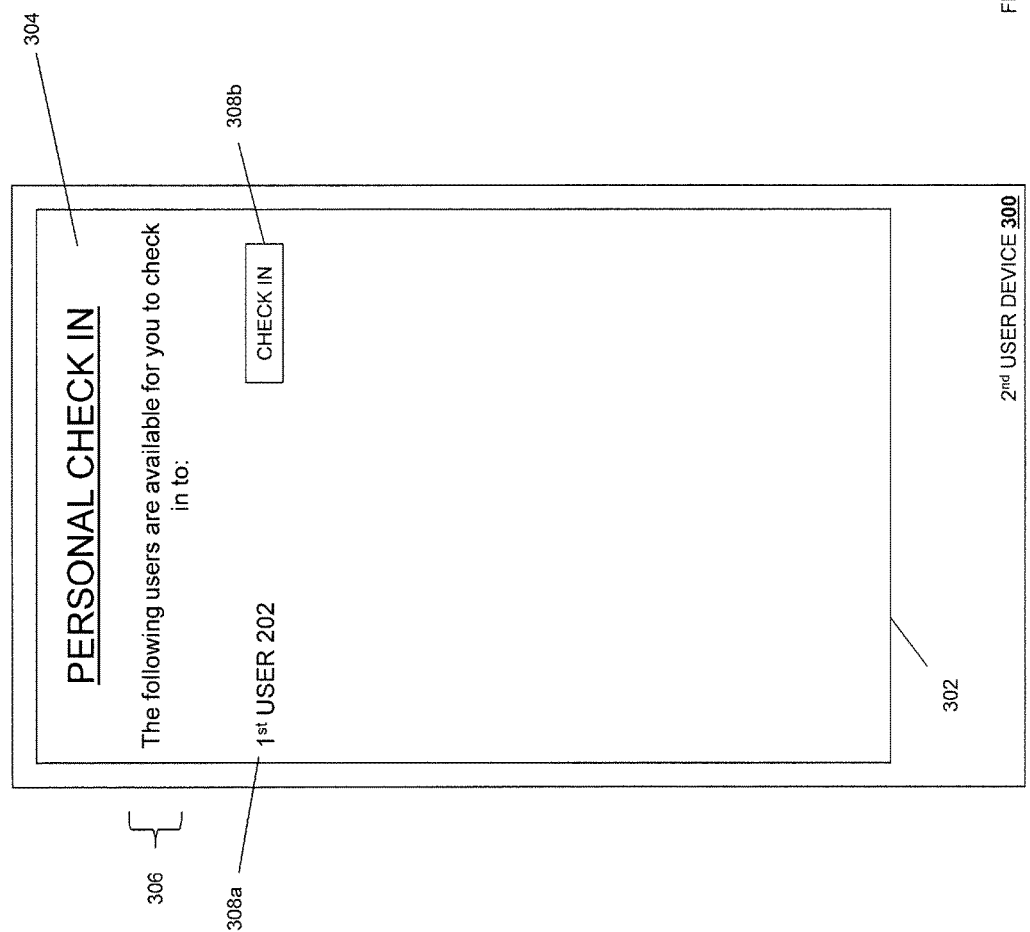

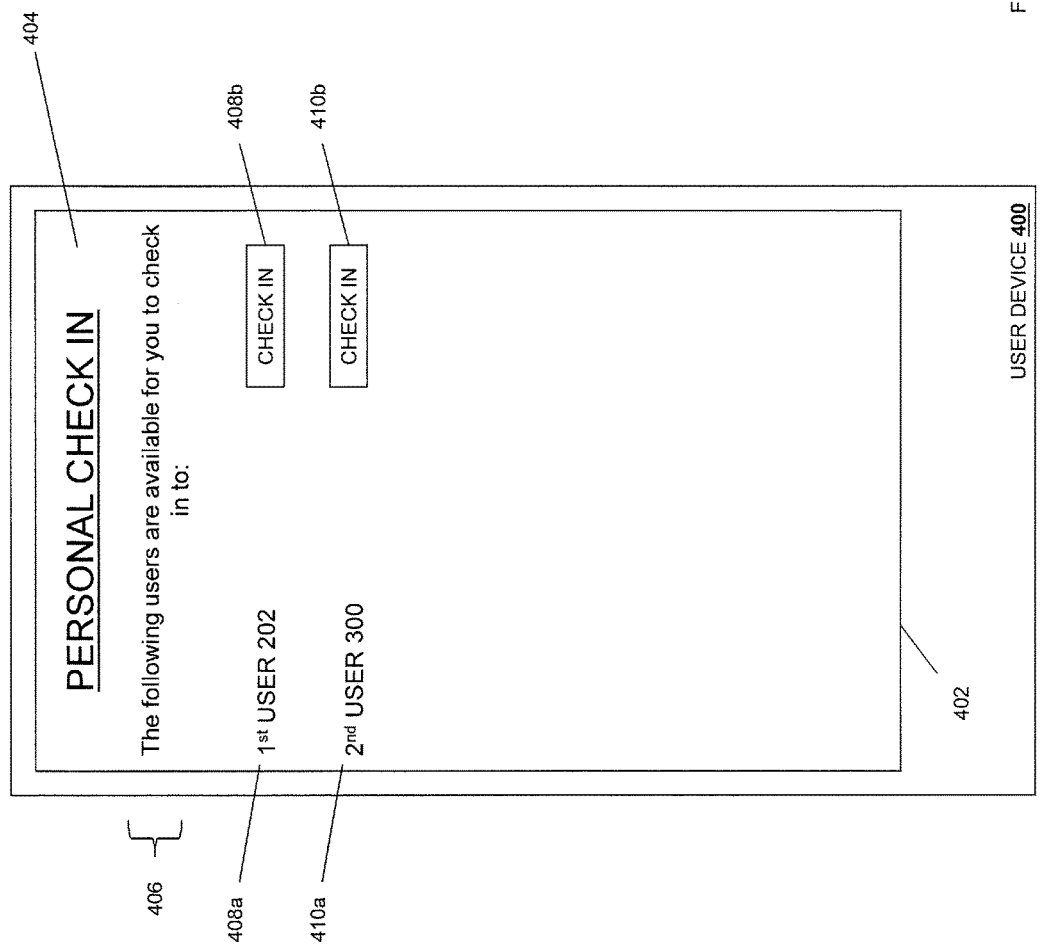

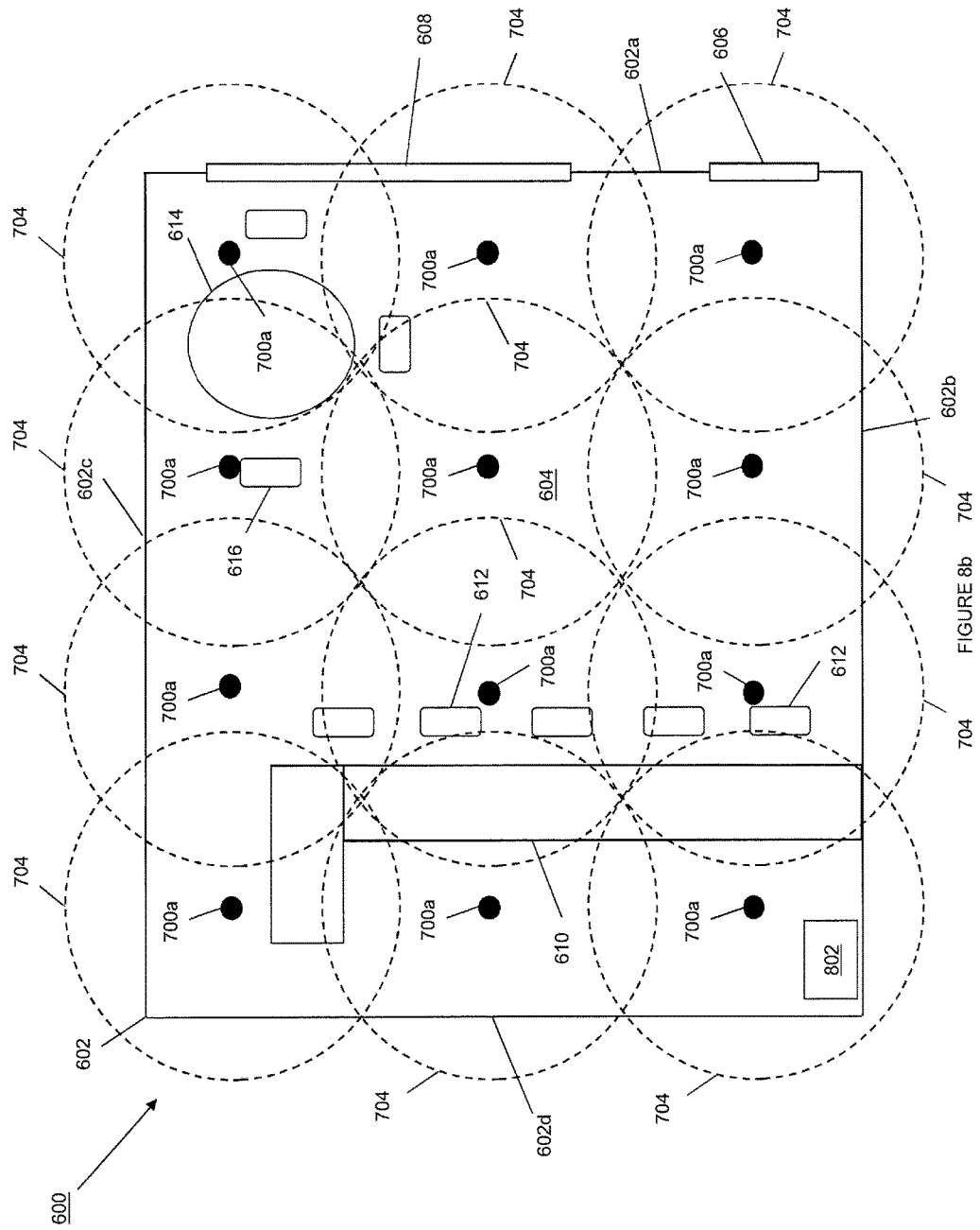

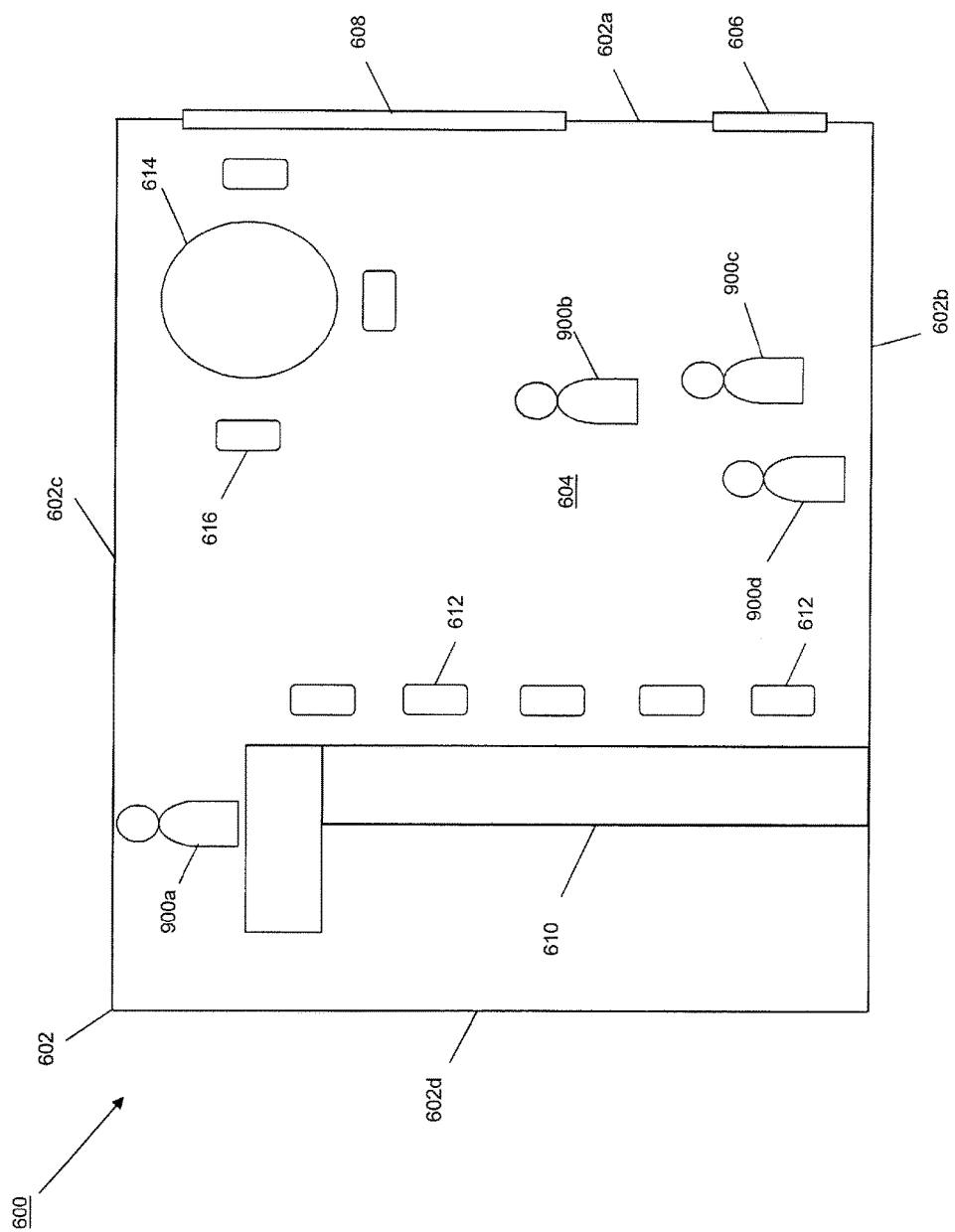

PERSON/GROUP CHECK-IN SYSTEM

BACKGROUND

Field of the Invention

The present disclosure generally relates to online and/or mobile payment systems, and more particularly to systems and methods that provide for users to check-in to a person and/or group and that may be used in conjunction with online and/or mobile payment systems.

Related Art

More and more consumers are purchasing items and services over electronic networks such as, for example, the Internet. Consumers routinely purchase products and services from merchants and individuals alike. The transactions may take place directly between a conventional or on-line merchant or retailer and the consumer, and payment is typically made by entering credit card or other financial information. Transactions may also take place with the aid of an on-line or mobile payment service provider such as, for example, PayPal, Inc. of San Jose, Calif. Such payment service providers can make transactions easier and safer for the parties involved. Purchasing with the assistance of a payment service provider from the convenience of virtually anywhere using a mobile device is one main reason why on-line and mobile purchases are growing very quickly.

Customers of a merchant may visit that merchant regularly in groups of two or more customers. For example, customers of a restaurant or bar may go to that restaurant or bar together as a group regularly. Conventional merchant systems may attempt to track customer visits to, and spending with, the merchant by, for example, providing frequent customer cards to the customers that are presented each time the customer visits the merchant, tracking spending by individual customers (e.g., via credit card spending or an account) at the merchant, and/or using a variety of other conventional user tracking systems known in the art. In some situations, individual customers may be allowed to "check-in" to a merchant by using location-based social networking systems such as the Foursquare application provided by Foursquare Labs, Inc. of New York City, N.Y. Checking-in to a merchant allows a customer that is located at or near the physical merchant location of the merchant to associate themselves with that merchant, and may be used by the merchant to track some customer behaviors or interactions with the merchant. However, conventional check-in systems only allow individual customers to check-in to merchants, and provide no method by which the merchant may determine whether there is any association with groups of customers who visit their physical merchant location.

Thus, there is a need for improved user association systems.

BRIEF DESCRIPTION OF THE FIGURES

FIG. 2a is a schematic view illustrating an embodiment of a first user device enabling check-ins to their user account;

FIG. 3a is a schematic view illustrating an embodiment of a second user device checking into a user account of the first user device of FIG. 2a;

FIG. 3b is a screen shot view illustrating an embodiment of the second user device of FIG. 3a checking into a user account of the first user device of FIG. 2a;

FIG. 4a is a schematic view illustrating an embodiment of a third user device checking into a user account of the first user device of FIG. 2a and/or the second user device of FIG. 3a;

FIG. 4b is a screen shot view illustrating an embodiment of the third user device of FIG. 4a checking into a user account of the first user device of FIG. 2a and/or the second user device of FIG. 3a;

FIG. 8b is a schematic view illustrating an embodiment of the person/group check-in system of FIG. 8a with the beacon devices providing communication areas;

FIG. 9b is a schematic top view illustrating an embodiment of a plurality of users in a group at the physical merchant location of FIG. 6;

Figure 1:
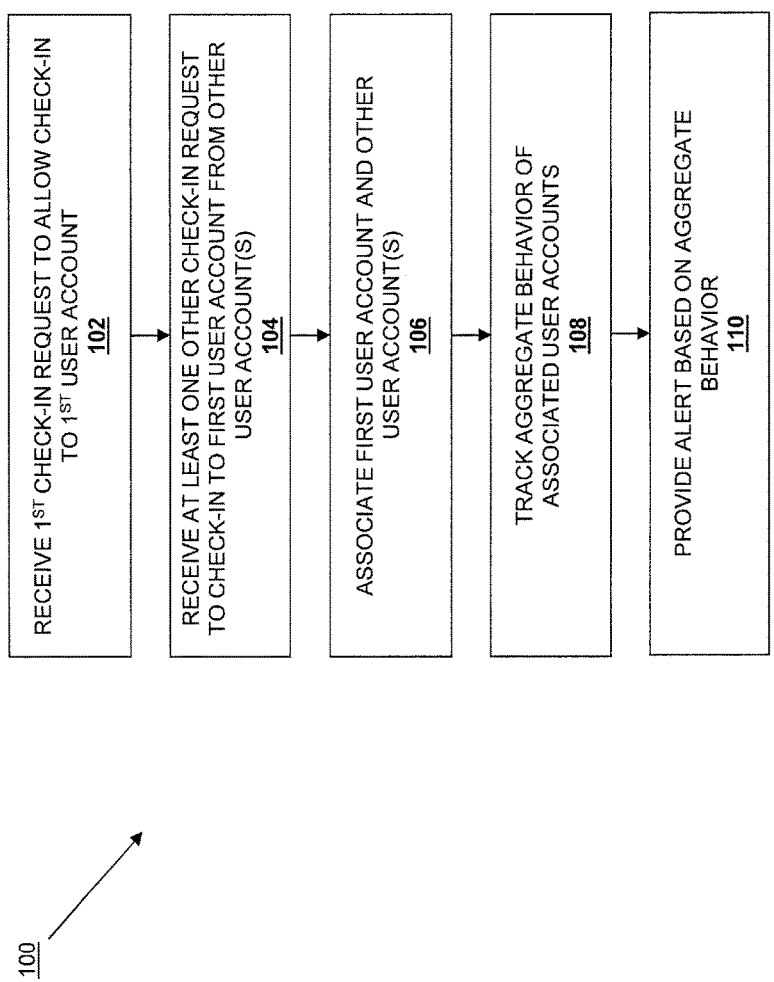
FIG. 1 is a flow chart illustrating an embodiment of a method for checking in to a person/group.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure provides a system and method for person/group check-ins that provide for the association of a plurality of users together and the subsequent tracking of their individual and aggregate behavior. A first user may use their first user device to allow check-ins to their first user account, and then any other users may use their other user devices to check-in (via their other user accounts) to the first user account. These person/group check-ins associate the first user account and the other user accounts and provide, for example, for the tracking of the aggregate spending of the group with one or more merchants or physical merchant locations, the pooling or funds provided from any of the user accounts for use by the group, the informing or identification of spending by one or more members of the group to other members of the group, and/or a variety of other benefits over conventional check-in systems that are limited to a single user checking-in with a merchant and that will be apparent to one of skill in the art in possession of the present disclosure.

Referring first to FIG. 1, an embodiment of a method 100 for providing person/group check-ins is illustrated. In some embodiments, the method 100 may be performed by a check-in system provider such as, for example, Foursquare Labs, Inc. of New York City, N.Y. In some embodiments, the method 100 may be performed by a payment service provider such as, for example, PayPal, Inc. of San Jose, Calif. In some embodiments, the method 100 may be performed by a merchant such as, for example, the merchants discussed below. In some embodiments, the method 100 may be performed by any combination of the check-in system providers, payment service providers, merchants, and/or other entities introduced above and/or discussed below. Thus, references to a system provider below are meant to encompass any single entity or combination of entities discussed herein that may operate to perform the functionality of the systems and methods described herein.

In an embodiment, a system provider controls a system provider device is coupled to a non-transitory, computer-readable medium in a storage system that includes one or more databases that store a plurality of user accounts. For example, any of the users discussed below may use their user devices to register with the system provider device to create a user account that associates the user with the user account, the user device, and/or any other check-in system details known in the art. Thus, each of the users discussed below may include a unique user account with the system provider device. In addition, the merchants discussed below may also use merchant devices to register merchant accounts with the system provider device.

Figure 2B:
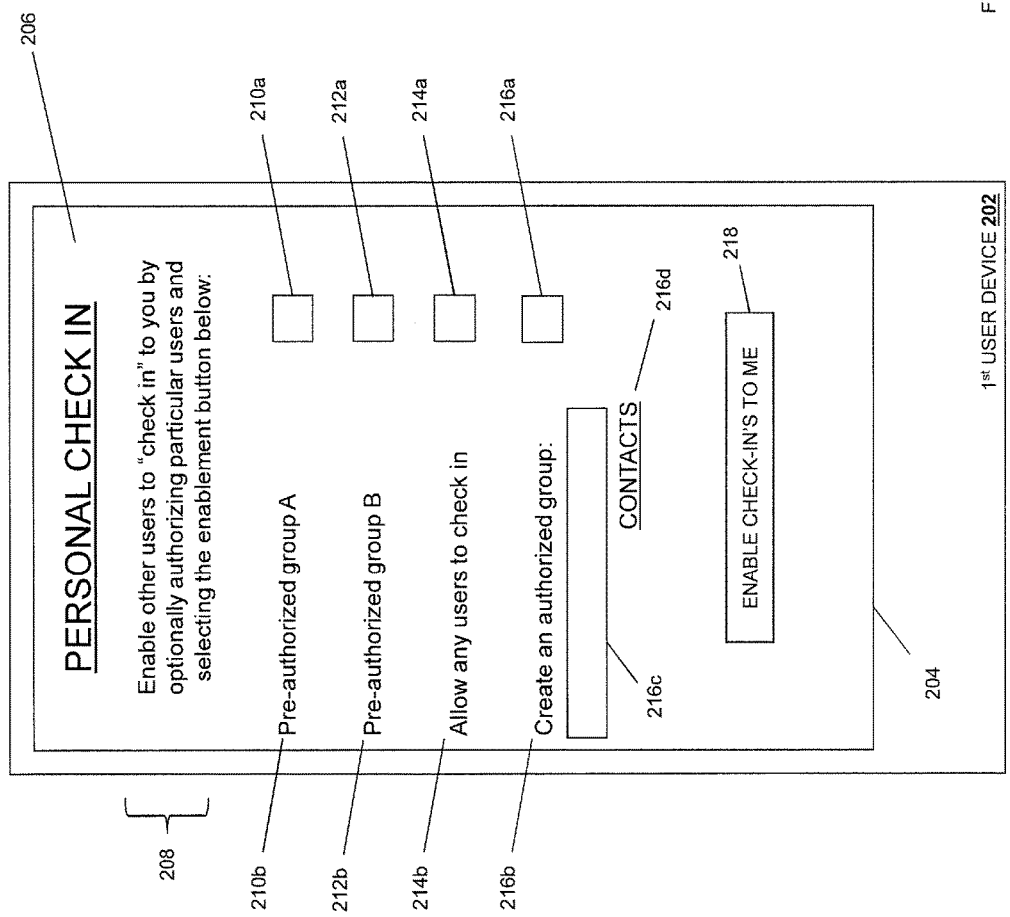
FIG. 2b is a screen shot view illustrating an embodiment of the first user device of FIG. 2a enabling check-ins to their user account.

Referring now to FIGS. 1, 2a, and 2b, the method 100 begins at block 102 where a first check-in request to allow check-ins to a first user account is received. In an embodiment, the system provider device may receive the first check-in request over a network (e.g., the Internet) from a first user device of a first user that is associated with a first user account. FIG. 2a illustrates an embodiment of a person/group check-in system 200 with a first user device 202 of a first user (not illustrated). In one example, the first user may be at a restaurant, bar, amusement park, movie theater, and/or a variety of other physical merchant locations known in the art, and that first user may wish to associate themselves with other users to realize any of the variety of benefits discussed below. In such an example, the first user device 202 including a display device 204 may display a check-in request screen 206, illustrated in FIG. 2b. In an embodiment, the first user device 202 may include a check-in application or other software that may be launched by the first user (or automatically launched upon, for example, entering a physical merchant location, discussed in further detail below) in order to cause the first user device 202 to display the check-in request screen 206. In some embodiments, the first user may be required to provide credentials (e.g., a username and passcode) to access their first user account through the check-in request screen 206.

The check-in request screen 206 includes an informational section 208 that explains to the first user that they may authorize other users to check-in to their first user account by selecting a selection box 210a for a first pre-authorized group 210b, a selection box 212a for a second pre-authorized group 212b, a selection box 214a to allow any users to check-in to their first user account, or a selection box 216a to create an authorized group 216b using an authorized user input box 216c and/or a link 216d to a user contacts list. In an embodiment, the first user may wish to allow any other users to check-in to their first user account, and thus may select the selection box 214a and an enable check-ins button 218 to send the first check-in request over the network to the system provider device that causes the system provider device to associate any other user accounts with the first user account in response to a check-in request received from those other user accounts, discussed in further detail below.

In other embodiments, the first user may wish to restrict which other users may check-in to their first user account, and thus may either create an authorized group (or otherwise designate a plurality of other user accounts that are authorized to check-in to the first user account) by selecting the selection box 216a and the enable check-ins button 218 to send the first check-in request over the network to the system provider device that causes the system provider device to associate other user accounts with the first user account in response to a check-in request received from those other user accounts and a determination that those other user accounts are authorized to check-in to the first user account, discussed in further detail below. Authorization by the first user of other user accounts may be performed by providing an identifier (e.g., a mobile phone number, an email address, and/or other user account identifiers known in the art) of the authorized other user accounts in the authorized user input box 216c, or selecting other user accounts through a contact list on the user device that is accessed using the link 216d. As such, the user may "build" an authorized group of other user accounts that are authorized to check-in to the first user account. Any authorized group may be created and saved such that future check-in requests from the first user may be made by selecting the previously authorized group. For example, each of the first pre-authorized group 210b and the second pre-authorized group 212b may have been created in such a manner, and the first user may simply select the selection boxes 210a and/or 212a and the enable check-ins button 218 in order to send the first check-in request over the network to the system provider device that causes the system provider device to associate other user accounts with the first user account in response to a check-in request received from those other user accounts and a determination that those other user accounts are authorized to check-in to the first user account as part of a previously authorized group, discussed in further detail below. While a few examples have been provided, one of skill in the art in possession of the present disclosure will recognize that the authorization of other user accounts to check-in to a first user account may occur in a variety of manners while remaining within the scope of the present disclosure.

Referring now to FIGS. 1, 3a, and 3b, the method 100 may then proceed to block 104 where at least one other check-in request to check-in to the first user account is received from other user account(s). In an embodiment, the system provider device may receive the at least one other check-in request over a network (e.g., the Internet) from other user device(s) of other user(s) that are associated with other user account(s). FIG. 3a illustrates the person/group check-in system 200 including the first user device 202 and a second user device 300. In one example, the first user device 202 may have already sent the first check-in request at block 102 to allow check-ins to the first user account at block 102, and the second user of the second user device 300 may wish to check-in to the first user account (e.g., because the first user and the second user are friends or otherwise part of the same group). In such an example, the second user device 300 including a display device 302 may display a check-in request screen 304, illustrated in FIG. 3b. In an embodiment, the second user device 300 may include a check-in application or other software that may be launched by the second user (or automatically launched upon, for example, entering a physical merchant location as discussed below, communicating with the first user device 202, etc.) in order to cause the second user device 300 to display the check-in request screen 304.

The check-in request screen 304 includes an informational section 306 that explains to the second user that there are other user accounts that they may check-in to, along with a user indicator 308a of the user 202 and a check-in box 308b that the second user may select to send the second check-in request to the system provider device. In an embodiment, upon launching, the check-in application on the second user device 300 may attempt to communicate with any other user devices within maximum distance to determine whether any of those other user devices have enabled check-ins to their associated user accounts. In one example, the maximum distance may be determined using location coordinates of the second user device 300 and other user devices (e.g., the first user device 202) that are communicated to the system provider device (e.g., the system provider device may allow the second user to check in to user accounts associated with user devices that are within the maximum distance from the second user device 300). In another example, the maximum distance may be determined by the communication technology being used (e.g., check-in to the first user device 202 may only be allowed via direct Bluetooth communications between the first user device 202 and the second user device 300 and thus limited by the maximum distance the Bluetooth communication is capable of, check-in to the first user device 102 may only be allowed via communication with the system provider device through the beacon devices discussed below and thus limited by the maximum distance the beacon devices are capable of, etc.). In a specific example, the maximum distance may be selected such that the second user device 300 or system provider device can determine whether any user devices in a particular physical merchant location or physical merchant locations are allowing check-ins to their associated user accounts.

Thus, at block 104 of the method 100, the second user may select the check-in button 308b to send the system provider device the second check-in request to check-in to the first user account associated with first user device 202. In response to receiving that second check-in request, the system provider device may determine if check-in access to the first user account is restricted. If check-in access to the first user account is restricted (e.g., due to the first user enabling check-in access to the first user account to only authorized users as discussed above), the system provider device may then determine whether the second user is authorized to check-in to the first user account by determining whether the second user account associated with the second user device 300 has been authorized by the first user to check-in to the first user account. If that second user account is not authorized to check-in to the first user account, the second user device 300 may display a failed check-in message that informs the second user that they are not authorized to check-in to the first user account associated with the first user device 202.

The method 100 may then proceed to block 106 where the first user account is associated with other user account(s). In an embodiment, upon receiving the other check-in request at block 104 and confirming that the other user account providing that other check-in request is authorized to check-in to the first user account (or that check-in access to the first user account is unrestricted), the system provider device may associate the first user account and the other user account in a database. For example, at block 106, the system provider device may determine that the second user device 300 is associated with a second user account that has been authorized by the first user device 202 to check-in to the first user account (or that check-in access to the first user account is unrestricted) and, in response, associate the first user account and the second user account in a database. As discussed below, the association of the first user account and other user accounts at block 106 links the behavior of their associated users, user devices, user payment accounts, and/or other user attributes to allow aggregate behaviors of the group of users to be tracked or monitored.

As discussed in further detail below, the association of the first user account and the second user account upon the second user using the second user device to check-in to the first user device 102 may exist for any amount of time that may be selected or determined by the users, the merchant, and/or the system provider device. For example, the association of the first user account and the second user account may exist for as long as the first user device 202 and second user device 300 are co-located or within a maximum distance from each other (e.g., as long the first user device 202 and the second user device 300 are both located at the physical merchant location discussed below). Co-location or maximum distance may be determined by location coordinates sent by the first user device 202 and the second user device 300 to the system provider device, based on continued communications capability (e.g., relatively short range communication such as Bluetooth, beacon device, etc.) between the first user device 202 and the second user device 300, and/or using a variety of other techniques known in the art. In another example, the association of the first user account and the second user account may exist for a predetermined or selected amount of time (e.g., a number of hours, an evening, a weekend, etc.). In yet another example, the association of the first user account and the second user account may exist until at least one of the first user and the second user sends an instruction to check-out or otherwise disassociate from the other user account. While a few examples of how the timing of the first user account/second user account association is determined have been provided, one of skill in the art in possession of the present disclosure will recognize that any disassociation factors may be considered and utilized in disassociating the first user account and the second user account while remaining within the scope of the present disclosure.

In some embodiments, prior or subsequent to the association of the first user account and the second user account at block 106, the second user may enable check-ins to the second user account associated with the second user device 300 in substantially the same manner as discussed above for the first user with the first user device 202 and first user account. As such, the second user may authorize other user accounts to check-in to the group in the same manner as the first user may have at block 102. In some embodiments, the first user may be able to restrict the ability of the second user to authorize user accounts to check-in to the group once the second user has checked into the first user account.

Figure 4A:
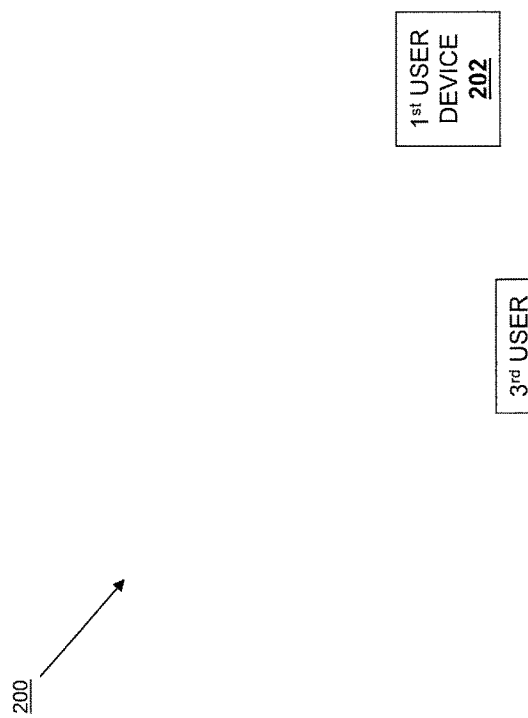

Referring now to FIGS. 1, 4a, and 4b, an example of block 104 of the method 100 in which the system provider device receives the at least one other check-in request over the network (e.g., the Internet) from a third user device of a third user that is associated with a third user account is illustrated. FIG. 4a illustrates the person/group check-in system 200 including the first user device 202, the second user device 300, and a third user device 400. In one example, the first user device 202 may have already sent the first check-in request to allow check-ins to the first user account at block 102, the second user of the second user device 300 may have already checked-in to the first user account, and the third user of the third user device 400 may wish to check-in to either or both of the first user account and the second user account (e.g., because the first user, the second user, and the third user are friends or otherwise part of the same group). In such an example, the third user device 400 including a display device 402 may display a check-in request screen 404, illustrated in FIG. 4b. In an embodiment, the third user device 400 may include a check-in application or other software that may be launched by the third user (or automatically launched upon, for example, entering the physical merchant location discussed below, communicating with the first user device 202 or the second user device 202, etc.) in order to cause the third user device 400 to display the check-in request screen 404.

The check-in request screen 404 includes an informational section 406 that explains to the third user that there are other user accounts that they may check-in to, along with a user indicator 408a of the first user 202 and a check-in box 408b that the third user may select to send a third check-in request to the system provider device, and a user indicator 410a of the second user 300 and a check-in box 410b that the third user may select to send a third check-in request to the system provider device. In an embodiment, upon launching, the check-in application on the third user device 400 may attempt to communicate with any other user devices within a maximum distance to determine whether any of those other user devices have enabled check-ins to their associated user accounts. In one example, the maximum distance may be determined using location coordinates of the third user device 400 and other user devices (e.g., the first user device 202 and the second user device 300) that are communicated to the system provider device (e.g., the system provider device may allow the third user to check in to user accounts associated with user devices that are within the maximum distance from the third user device 400). In another example, the maximum distance may be determined by the communication technology being used (e.g., check-in to the first user device 202 and/or the second user device 300 may only be allowed via direct Bluetooth communications between the first user device 202/second user device 300 and the third user device 400 and thus limited by the maximum distance the Bluetooth communication is capable of, check-in to the first user device 202 and/or the second user device 300 may only be allowed via communication with the system provider device through the beacon devices discussed below and thus limited by the maximum distance the beacon devices are capable of etc.). In a specific example, the maximum distance may be selected such that the third user device 400 or system provider device can determine whether any user devices in a particular physical merchant location or physical merchant locations are allowing check-ins to their associated user accounts.

Thus, at block 104 of the method 100, the third user may select the check-in button 408b to send the third check-in request to check-in to the first user account associated with first user device 202 to the system provider device, and/or may select the check-in button 410b to send the third check-in request to check-in to the second user account associated with second user device 300 to the system provider device.

In response to receiving that third check-in request, the system provider device may determine if check-in access to the first user account and/or the second user account is restricted. If check-in access to the first user account and/or the second user account is restricted (e.g., due to the first user and/or the second user enabling check-in access to the first user account and/or the second user account to only authorized users as discussed above), the system provider device may then determine whether the third user is authorized to check-in to the first user account and/or second user account by determining whether the third user account associated with the third user device 400 has been authorized by the first user and/or the second user to check-in to the first user account and/or the second user account. If that third user account is not authorized to check-in to the first user account and/or the second user account, the third user device 400 may display a failed check-in message that informs the third user that they are not authorized to check-in to the first user account associated with the first user device 202 and/or the second user account associated with the second user device 300. In an embodiment, the third user device 400 may only need be authorized to check-in to one of the first user account or second user account (or other user accounts) in order to be allowed to check into the group, while in other embodiments, the third user device 400 may need to be authorized by each user account in the group (e.g., the first user account and the second user account) in order to be allowed to check into the group.

The method 100 may then proceed to block 106 where the first user account is associated with other user account(s). In an embodiment, upon receiving the other check-in request at block 104 and confirming that the other user account providing that other check-in request is authorized to check-in to the first user account and/or the second user account, the system provider device may associate the first user account and the other user account in a database. For example, at block 106, the system provider device may determine that the third user device 300 is associated with a third user account that has been authorized by the first user device 202 and/or the second user device 300 to check-in to the first user account and/or the second user account and, in response, associate the first user account, the second user account, and/or the third user account in a database. As discussed below, the association of the first user account and other user accounts at block 106 links the behavior of their associated users, user devices, user payment accounts, and/or other user attributes to allow aggregate behaviors of the group of users to be tracked or monitored.

As discussed in further detail below, the association of the first user account, the second user account, and the third user account upon the third user using the third user device 400 to check-in to the first user device 102 and/or the second user device 300 may exist for any amount of time that may be selected or determined by the users, the merchant, and/or the system provider device. For example, the association of the first user account, the second user account, and the third user account may exist for as long as the first user device 202, second user device 300, and the third user device 400 are co-located or within a maximum distance from each other (e.g., as long the first user device 202, second user device 300, and the third user device 400 are both located at the physical merchant location discussed below). Co-location or maximum distance may be determined by location coordinates sent by the first user device 202, second user device 300, and the third user device 400 to the system provider device, based on continued communications capability (e.g., relatively short range communication such as Bluetooth, beacon device, etc.) between the first user device 202, second user device 300, and the third user device 400, and/or using a variety of other techniques known in the art such that any device that moves too far away from the other devices may be disassociated from the group. In another example, the association of the first user account, the second user account, and the third user account may exist for a predetermined or selected amount of time (e.g., a number of hours, an evening, a weekend, etc.). In yet another example, the association of the first user account, the second user account, and the third user account may exist until at least one of the first user, the second user, and the third user sends an instruction to check-out or otherwise disassociate from the other user accounts. While a few examples of how the timing of the first user account/second user account/third user account association is determined have been provided, one of skill in the art in possession of the present disclosure will recognize that any disassociation factors may be considered and utilized in disassociating the first user account, the second user account, and the third user account while remaining within the scope of the present disclosure.

In some embodiments, prior or subsequent to the association of the first user account, the second user account, and the third user account at block 106, the third user may enable check-ins to the third user account associated with the third user device 400 in substantially the same manner as discussed above for the first user with the first user device 202 and first user account. As such, the third user may authorize other user accounts to check-in to the group in the same manner as the first user may have at block 102. In some embodiments, the first user and/or the second user may be able to restrict the ability of the third user to authorize user accounts to check-in to the group once the third user has checked into the first user account and/or the second user account (e.g., a user may restrict the user accounts that may be added to the group for any user accounts that have checked-in to that user).

In some embodiments, the third user account may be associated directly with the first user account in response to checking into the first user account, or may be associated indirectly with the first user account in response to checking into the second user account. As such, groups of users may grow by a secondary user checking into a primary user that enabled person/group check-ins, or a tertiary user checking into a secondary user that checked-in to the primary user that enabled person/group check-ins. Furthermore, different levels of association between user accounts may be made based on whether a user account directly checks-in to another user account or indirectly checks-in to another user account. Rules for such associations (e.g., when and who a user is directly checked-in to, when and who a user is indirectly checked-in to, etc.) may be set by the system provider, the users, merchants, and/or combinations thereof. While only three users are illustrated and described herein as being checked-into the person/group, one of skill in the art in possession of the present disclosure will recognize that any number of users may check into a person or group in substantially the same manner as discussed above while remaining within the scope of the present disclosure.

The method 100 then proceeds to block 108 where aggregate behavior of associated user accounts is tracked. While a few examples are provided below, any variety of aggregate behavior of the group of user accounts may be tracked at block 108 and is envisioned as falling within the scope of the present disclosure. For example, as discussed above, in some embodiments each of the user accounts may be associated with a user payment account provided to each of the users by a payment service provider, and the system provider device may track each of those payment accounts separately and/or in the aggregate as part of the aggregate spending behavior of the user accounts that were associated as part of the group at block 106. As such, in some embodiments, the aggregate spending behavior of the associated accounts may be tracked by tracking each of a plurality of user payment accounts that are associated with grouped user accounts. Furthermore, check-in behavior, discussed above, may be tracked as part of the aggregate behavior of associated user accounts tracked at block 108.

Figure 5:
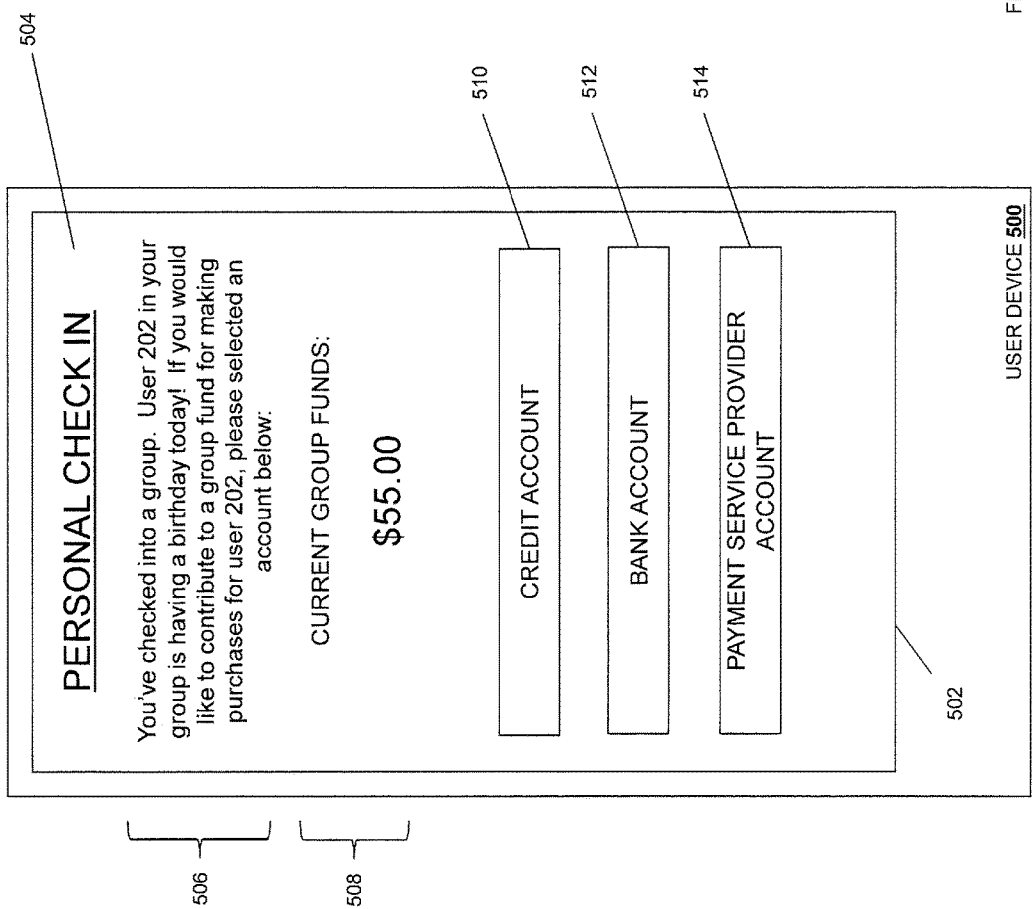
FIG. 5 is a screen shot view illustrating an embodiment of a user device contributing funds to a group fund.

Referring now to FIG. 5, an embodiment of a user device 500 is illustrated that may be any of the first user device 202, the second user device 300, and/or the third user device 400 discussed above. The user device 500 includes a display device 502 that is displaying a group funding screen 504 that may be used to track aggregate behavior of the associated user accounts at block 108. The group funding screen 504 includes an information section 506 which, in the illustrated embodiment, is informing the user of the user device 500 that one of the other users that is checked-in to the group is having a birthday and that the user of the user device 500 may contribute to a group fund for making purchases for the user having the birthday. While a specific example of a group fund dedicated to a user of the group is described and illustrated, one of skill in the art in possession of the present disclosure will recognize that a group fund made up of contributions from checked-in users in a group may be utilized in any manner by any combination of users in the group while remaining within the scope of the present disclosure.

The group funding screen also includes a group fund amount 508 that indicates an amount of group funds that are available, along with a credit account selector 510, a bank account selector 512, and a payment service provider account selector 514. In an embodiment, the user of the user device 500 may select the credit account selector 510, the bank account selector 512, and/or the payment service provider account selector 514 in order to select an account from which to designate or transfer funds to the group fund. For example, a payment service provider device and/or system provider device may allow users to select funding account(s) and designate an amount that may be used from those funding account(s) to fund purchases using the group funds. As such, a designated amount from a selected funding account of the user of the user device 500 may be considered by the payment service provider as authorized by that user for use in making purchases by a user or users in the group. One of skill in the art will recognize that any number of users may contribute to the group fund in substantially the same manner as described above for the user of the user device 500. In one embodiment, the group fund may be submitted to a merchant as a "tab" or account that may be charged for purchases by users in the group, and funds may be transferred from the group fund (e.g., the different user payment accounts that transferred funds to the group fund) to a merchant account to pay for any purchases by users in the group. Thus, at block 108 the system provider device may track use of the group fund as the aggregate behavior of the associated accounts.

In some embodiments, the payment service provider device and/or system provider device may allow for the designation of a payment account (e.g., using the credit account selector 510, the bank account selector 512, and/or the payment service provider account selector 514) from which funds may be used by the group without designating a fund amount. As such, payment accounts from different users in the group may be designated to split or cover different portions of any bill that results from group purchases from any merchant. In some embodiments, the payment service provider device and/or system provider device may provide for payment accounts designated to cover group purchases to be selected randomly to make payment for those group purchases. For example, in response to receiving a bill from a merchant that was a result of group spending of the users in the group, the system provider device may randomly or semi-randomly select one of the user payment accounts that have been designated to cover group spending in order to pay the entire amount of that bill.

The method 100 may then proceed to block 110 where an alert based on the aggregate behavior of the associated user accounts is provided. A few examples of alerts are provided below, but one of skill in the art in possession of the present disclosure will recognize that the tracking of the behavior of each of the users checked-in to the group will enable a wide variety of alerts that will fall within the scope of the present disclosure.

Figure 6:
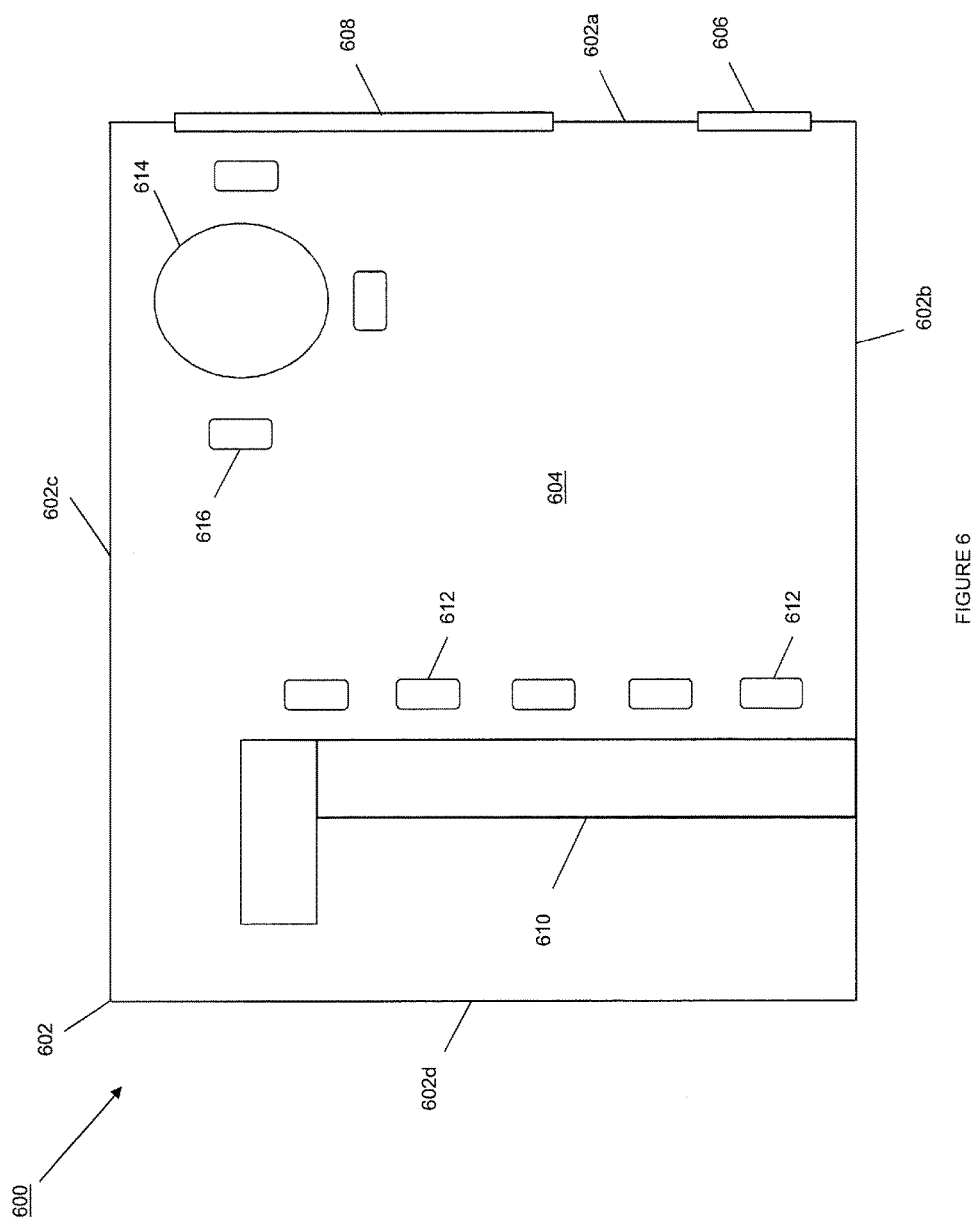
FIG. 6 is a schematic top view illustrating an embodiment of a physical merchant location.

Referring now to FIG. 6, an embodiment of a physical merchant location 600 is illustrated. The physical merchant location 600 includes a merchant building 602 having a plurality of exterior walls 602a, 602b, 602c, and 602d that define a physical merchant location interior 604. The exterior wall 602a includes an exterior door 606 (e.g., a "front" door in the illustrated embodiment) and an exterior window 608. The physical merchant location interior 604 includes a counter 610 and associated seats 612, as well as a table 614 and associated seats 616. In the illustrated example, the physical merchant location 600 is a restaurant or bar. However, as discussed above, the physical merchant location may be any variety of physical merchant locations or combinations of physical merchant locations in which the aggregate behavior of a group is tracked and used to provide alerts.

Figure 7:
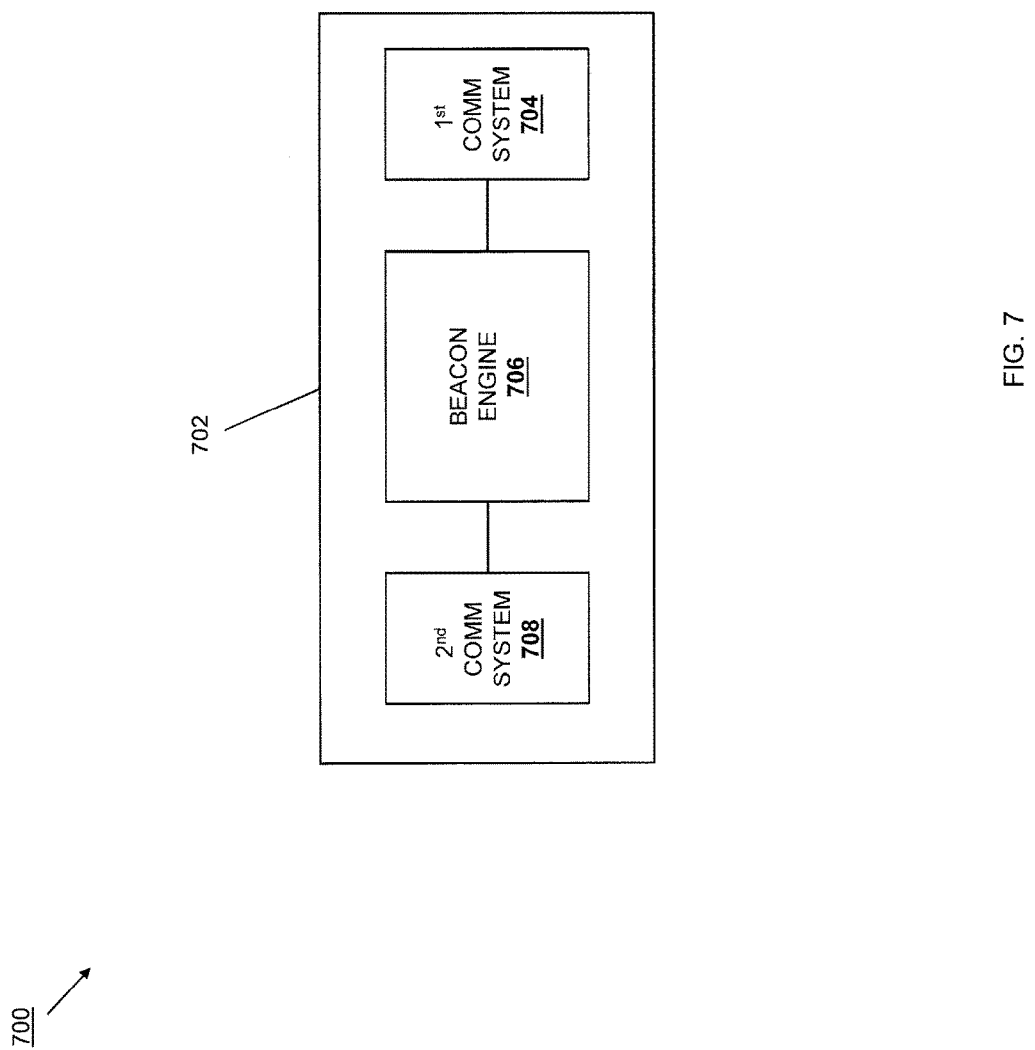
FIG. 7 is a schematic view illustrating an embodiment of a beacon device.

Referring now to FIG. 7, an embodiment of a beacon device 700 is illustrated. The beacon device 700 includes a chassis that houses a first communications system 704 such as, for example, a Wifi communications system. The first communications system 704 is coupled to a beacon engine 706 that may be provided by instruction on a memory system (not illustrated) in the beacon device 700 that, when executed by a processing system (not illustrated) in the beacon device 700, cause the processing system to perform the functions of the beacon device 700 discussed below. The beacon engine 706 is coupled to a second communication system 708 such as, for example, a Bluetooth® Low Energy (BLE) communication system. The beacon engine 706 may be configured to receive any of a variety of signals through the second communication system 708 and transmit those signals using the first communication system 704. While a few examples of communications components in the beacon device 700 have been described, one of skill in the art will recognize that other communications devices, as well as other components that have been omitted for clarity of discussion and illustrated, may be included in the beacon device 700 and will fall within the scope of the present disclosure. One of skill in the art will recognize that the components described above allow for the beacon device to be provided in a relatively small form factor such that it may be placed inconspicuously almost anywhere. The chassis 702 of the beacon device 700 may include any of a variety of features that allow for the coupling of the beacon device to different areas in a physical merchant location, discussed below.

Figure 8A:
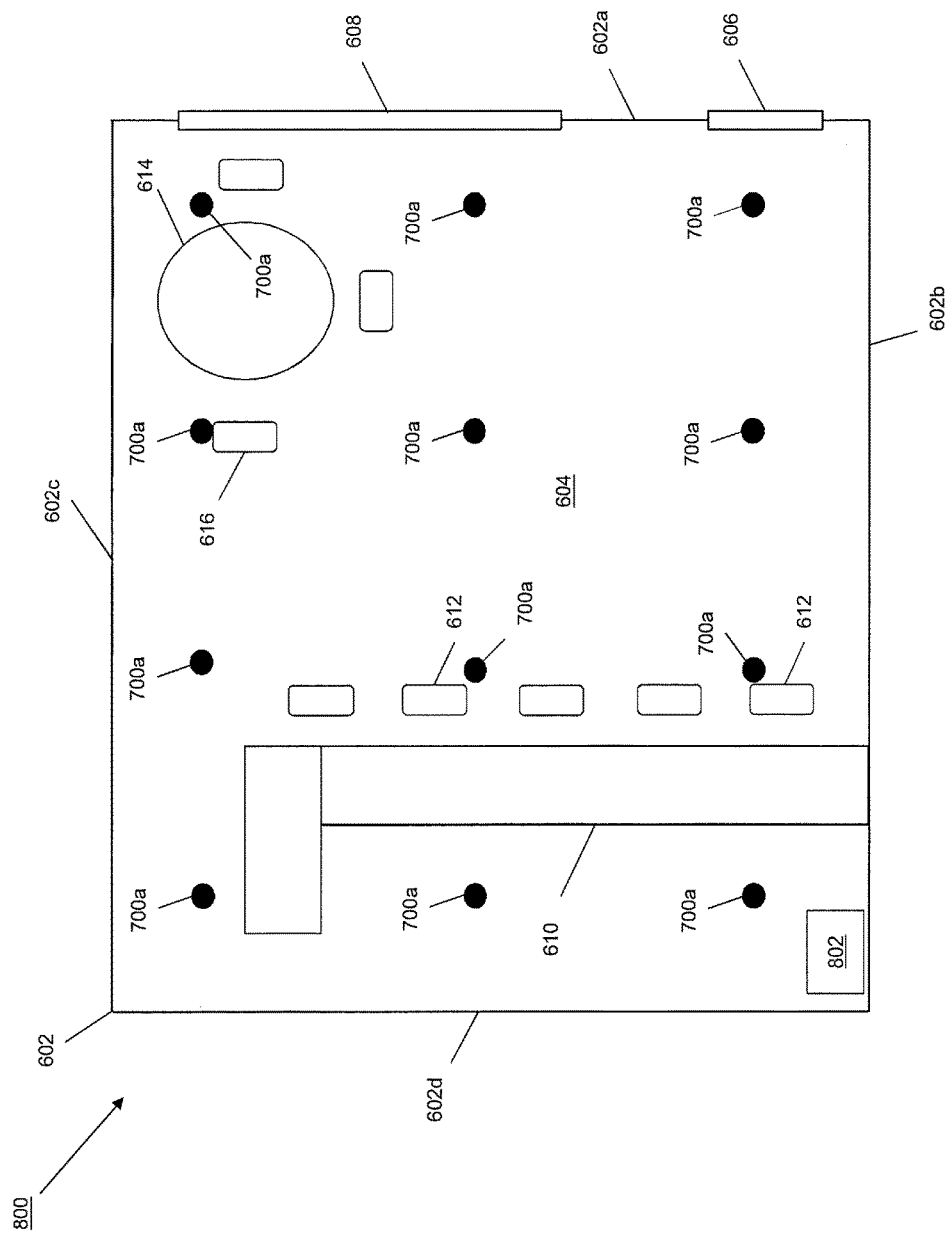
FIG. 8a is a schematic view illustrating an embodiment of a person/group check-in system that includes a plurality of the beacon devices of FIG. 7 in the physical merchant location of FIG. 6.

Referring now to FIGS. 8a and 8b, an embodiment of a person/group check-in system 800 is illustrated. As illustrated in FIG. 8a, the person/group check-in system 800 is provided by positioned a plurality of the beacon devices 700, discussed above with reference to FIG. 7, in and around the physical merchant location 600, discussed above with reference to FIG. 6. In the illustrated embodiment, a plurality of beacon devices 700a may be positioned in the physical merchant location 600. As discussed above, the beacon devices 700a may be sized such that they may be inconspicuously positioned virtually anywhere in or around the physical merchant location 600. For example, the beacon devices 700a may be positioned on the ceiling of the physical merchant location interior 604, behind the counter 610, on or around seats 612, on or around the table 614, on or around the seats 616, and/or in any other location depending on the desired coverage area of the beacon system. Each of the beacon devices 700 in the person/group check-in system 800 may be configured to wirelessly communicate, via its first communications system 704, with a merchant network communication device 802 such as, for example, a Wifi wireless router connected to a network such as the Internet.

Referring now to FIG. 8b, in operation, each of the beacon devices 700 is configured to create a communication area 804 with its second communications system 704. For example, the second communications system 704 in each beacon device 700 may be BLE communications device that provides an approximately 100 foot radius communication area, and the size of that communication area may be adjusted (e.g., by adjusting the power provided to the beacon device 700). However, other communication systems providing other communication areas are envisioned as falling within the scope of the present disclosure. As can be seen in the illustrated embodiment, the beacon devices 700 may be positioned in and around the physical merchant location 600 (and in some cases their power adjusted) such that the communication areas 704 abut, overlap, or otherwise provide coverage for any area of interest within and around the physical merchant location 600. As such, one of skill in the art in possession of the present disclosure will appreciate that different configurations of the beacon devices 700 within and around the physical merchant location 600 may be selected to cover any area within and around the physical merchant location 600 with a communications area 804. As discussed in further detail below, each of the beacon devices 700 are configured to communicate with beacon communication devices within their respective communication area 804 (e.g., using the second communication system 708) to collect data, and then send that data to the merchant network communication device 802 (e.g., using the first communication system 704) such that the data may be provided to a merchant device, a system provider device, and/or any other device operating to provide the merchant action recommendations discussed below.

In the embodiments illustrated and discussed below, the beacon devices 700 and their communication areas 804 are not illustrated for clarity of illustration and discussion, but it should be understood that the communication and retrieval of information from beacon communication devices, and that provision of that information to a system provider device, is accomplished using beacon devices providing communication areas such as the beacon devices 700 and communication areas 804 illustrated in FIGS. 8a and 8b. While a specific example of a person/group check-in system 800 in a particular physical merchant location 600 is provided, one of skill in the art in possession of the present disclosure will recognize that a wide variety of different physical merchant locations may incorporate the beacon devices 700 in a variety of manners while remaining within its scope.

In the embodiments discussed below, the person/group check-in systems and methods may involve a system provider using a system provider device to retrieve information collected by the beacon devices 700 through a network (e.g., the Internet). In such embodiments, the system provider may associate the physical merchant location 600 (or its merchant), the beacon devices 700, merchant devices, and/or other components of the system with a physical merchant location account in a database located in a non-transitory memory. As such, information received from the beacon devices and merchant devices may be associated with the physical merchant location account in the database, and any results of the analysis of that information may be stored in association with that physical merchant location account. In other embodiments, the system provider device may be a merchant device that is local to the physical merchant location 600 and that communicates with the beacon devices 700 using the merchant network communication device 802

FIGS. 6, 8a, and 8b illustrate a physical merchant location 600 that is a single building, and the beacon devices 700 are positioned to provide communication areas 804 that cover the interior of that single building and the exterior walkway outside the front of that single building. However, beacon devices 700 may be positioned virtually anywhere to retrieve information associated with a physical merchant location or multiple physical merchant locations. For example, the physical merchant location(s) may be located adjacent to or associated with a parking lot, and beacon devices may be positioned around that parking lot, at the entrances or exits of that parking lot, and/or anywhere else relative to that parking lot in order to collect and send information from beacon communication devices to the system provider device. In another example, the physical merchant location(s) may be located in a mall, and beacon devices may be positioned around that mall, at the entrances or exits of that mall, and/or anywhere else relative to that mall in order to collect and send information from beacon communication devices to the system provider device. In some examples, the first communication system may be connected to Wifi networks available outside the location(s) in order to communicate collected information to a system provider device. In other examples, the first communication system may be a cellular communications system that allows the beacon devices to be positioned anywhere in range of a cellular communications tower, allowing beacon devices to be positioned in virtually any physical location when providing the person/group check-in system.

Figure 9A:
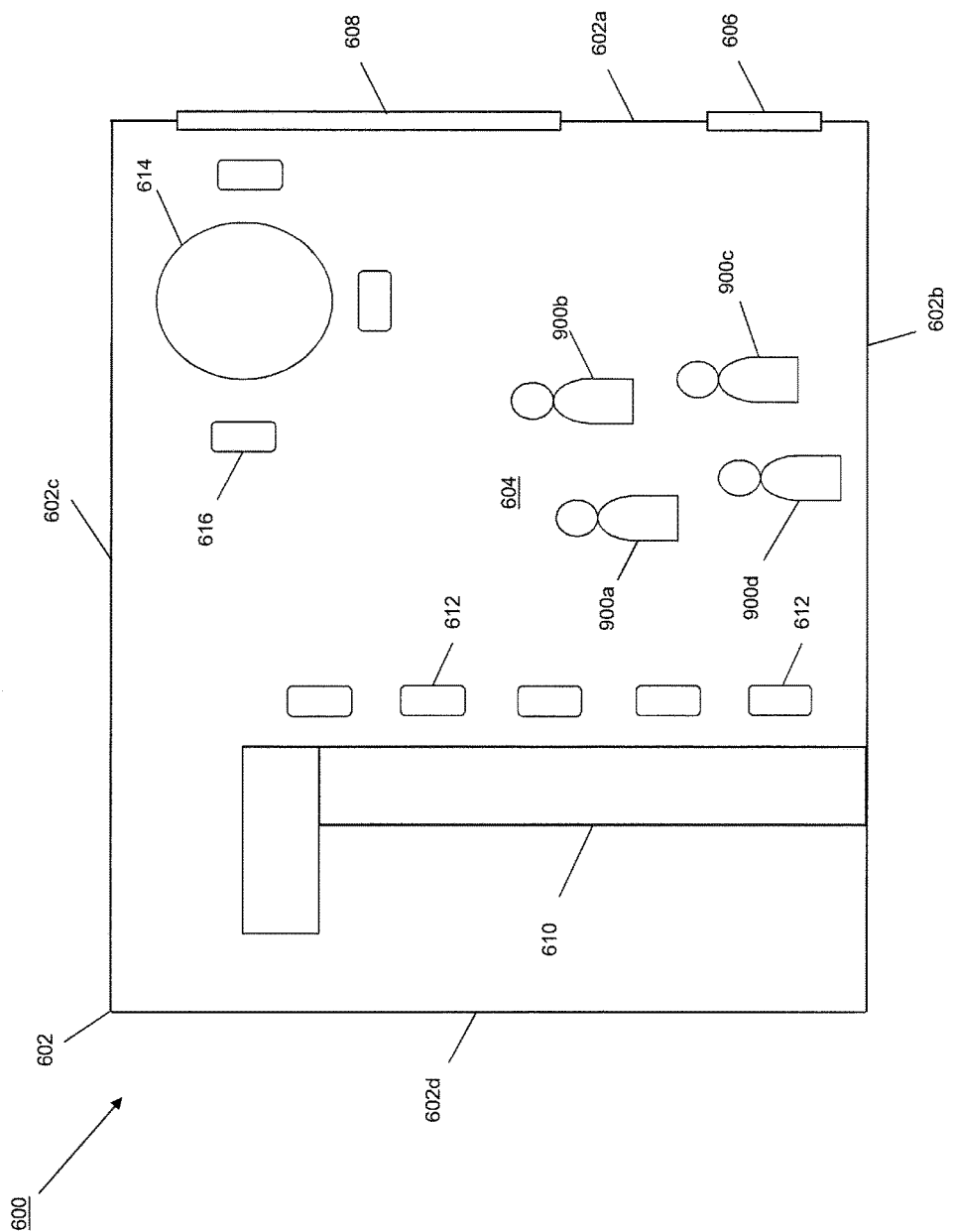
FIG. 9a is a schematic view illustrating an embodiment of a plurality of users in a group at the physical merchant location of FIG. 6.

Referring now to FIGS. 1, 9a, and 9b, at block 108, the beacon system discussed above may be used to track individual and/or aggregate behavior of associated user accounts. For example, FIG. 9a illustrates a plurality of users 900a, 900b, 900c, and 900d in the physical merchant location interior 604. In the illustrated embodiment, each of the users 900a-d may include a user device that has been used to check-in to a person/group as discussed above. For example, the user 900a may have used their user device to allow check-ins to their user account, and the users 900b-d may have used their user devices to check-in to the user account of the user 900a and/or the user accounts of the other users 900b-d.

At block 108, the beacon system may operate to communicate (e.g., via the BLE communication systems discussed above) with each of the user devices of the users 900a-d to, for example, track the locations of the users 900a-d in and around the physical merchant location 600, determine that users have checked-in to other users, track the use of user payment accounts by users 900a-d, and/or exchange any other information known in the art with the user devices of the users 900a-d. The use of the beacon system at the physical merchant location 600 with the person/group check-in system allows different aspects of the spending behavior (or attempted spending behavior) of the users 900a-d to be tracked. For example, FIG. 9b illustrates the user 900a having moved through the physical merchant location interior 604 to a position adjacent the counter 610. In an embodiment, the system provider device or merchant device may include a mapping of the physical merchant location 600 that describes the relative locations of features of the physical merchant location 600 (e.g., the counter 610, the seats 612, the table 614, the seats 616, etc.) such that the location tracking of the users 900a-d (via their user devices by the beacon system) within the physical merchant location interior 604 allows the system provider device to determine the relative location of the users 900a-d and the features of the physical merchant location 600.

In a specific embodiment, alerts may be provided by the system provider device to user devices of the users 900b-d when the user 900a enters a particular area in the physical merchant location 600 (or is positioned adjacent a feature in the physical merchant location 600). In another specific embodiment, alerts may be provided by the system provider device to user devices of the users 900b-d when the user 900a attempts to use their user payment account to make a purchase. For example, in the embodiments illustrated in FIGS. 9a and 9b, the user 900a may be having a birthday, and the users 900b-d may wish to cover or pay for all purchases made by the user 900a. In such an example, the tracking of the location and/or use of the user payment account of the user 900a may be utilized to alert the users 900b-d if the user 900a attempts to buy themselves a drink (e.g., either through their location adjacent the counter 610 or their attempt to use their user payment account to make a purchase). As such, in response to a purchase attempt by the user 900a, a spending alert may be sent to any or all of the user devices of the users 900b-d that informs those users 900b-d that the user 900a is attempting to make a purchase.

In some embodiments, any spending behavior using user accounts (or group funds) may be associated with a merchant or physical merchant location. For example, user payment accounts or group funds associated with the group of users may be associated with a merchant or physical merchant location based on purchase information that indicates that the purchase was made from the merchant or at the physical merchant location. In another example, the system provider device may retrieve a current location from any or all of the user devices of the users 900a-d, and a merchant or physical merchant location associated with the current location may be determined and associated with the aggregate behavior being tracked by the system. By associating the merchant or physical merchant location with the aggregate behavior being tracked at block 108, an alert may be sent at block 110 to the merchant that indicates to the merchant an amount spent by the group of users 900a-d, products purchased by the group of users 900a-d, and/or any other details of the aggregate behavior.

In some embodiments, the aggregate behavior may be associated with both the group and any plurality of merchants that the group interacts with. Thus, any tracked aggregate behavior of the group of users may be associated with that group as well as with the different merchants that they interact with. This allows the system provider device to determine how much the group of users spends with different merchants, and allows the system provider device to provide spending alerts to different merchants to indicate how much the group of users may spend with those different merchants if they can be enticed to visit their physical merchant locations. As such, the system provider device may provide a merchant with aggregate behavior information of a group of users along with a group discount request to entice that group of users to visit their physical merchant location (e.g., "This group of users typically spends $300 at bars on Friday nights—do you want to offer them a 10% discount to visit your bar tonight?"). This "shopping" of user groups to merchants may be instigated by the user group (e.g., "find us a merchant that will provide us a discount"), by the system provider device (e.g., as a service to link user groups and merchants), and/or by merchants (e.g., "find me users that will visit my physical merchant location.").

Similarly, tracked aggregate behavior and alerts associated with that tracking may include tracking how many users check-in to a particular user and alerting merchants about that aggregate behavior. For example, the system provider device may track a number of users (e.g., the users $900b$-$d$) that typically check-in to a particular user (e.g., user $900a$) to determine a typical or average number of users that check-in to that particular user. In some embodiments, that may include only users that directly check-in to that particular user, while in other embodiments, that may include users that directly check-in to that particular user as well as users that indirectly check-in to that particular user (e.g., by directly checking-in to users that are checked-in to that particular user). This allows the system provider device to determine how many users a particular user may entice to visit a merchant or physical merchant location, and allows the system provider device to provide alerts to different merchants to indicate how many users may visit those different merchants if the particular user can be enticed to visit their physical merchant locations. As such, the system provider device may provide a merchant with aggregate behavior information of a particular user along with a group discount request to entice that particular user to visit their physical merchant location (e.g., "This user typically brings 15 other users to merchants they visit on Saturday nights—do you want to offer them a 10% discount to visit your location tonight?"). This "shopping" of user groups to merchants may be instigated by the particular user (e.g., "find me a merchant that will provide me and my friends a discount"), by the system provider device (e.g., as a service to link particular users and their friends with merchants), and/or by merchants (e.g., "find me a particular user that will visit my physical merchant location with their friends.").

In some embodiments, the system provider device may utilize aggregate behavior of multiple different particular users and/or groups of users to provide alerts to merchants that allow them to determine numbers of users that may visit their physical merchant location in a given night, amounts that may be spent at their physical merchant location in a given night, and/or a variety of other information from the aggregate behaviors that are tracked by the system. For example, the system provider device may determine that particular users or user groups are planning on visiting a physical merchant location by retrieving calendar information from one or more of those particular users or user groups, and then reference the aggregate behavior associated with those particular users or user groups to inform the merchant associated with the physical merchant location to-be visited that they should expect a number of users (e.g., the number of total particular users and the associated groups of users that they typically bring to a physical merchant location) or a total amount spent (e.g., based on the spending behavior of each of the user groups that are planning on visiting the physical merchant location) for a given night. This information may be utilized by the merchant to determine product inventory amounts, staffing, and/or a variety of other merchant factors known in the art.

In some embodiments, a merchant may offer a discount for purchases by groups of users that exceed a minimum number of users. In such embodiments, the system provider device may report the number of users in a group and identifiers of the users in a group to the merchant, and when the number of users in a group exceeds the minimum amount, the merchant may provide discounts on purchases to the users in the group by, for example, sending a code (e.g., a QR code) or group name to each user in the group (e.g., via their user devices). Subsequent to receiving the code or group name, users in the group may present that code or group name to enable purchases from the merchant that have the discount applied. The system provider device may then track the number of users in the group and, if the number of users in the group drops below the minimum amount (e.g., due to users leaving the physical merchant location of the merchant), the merchant may deactivate the code or de-authorize the group name from receiving the discount.

Thus, systems and methods for providing person/group check-ins have been described that allow users to associate in groups such that their individual and aggregate behavior may be tracked and alerts issued to a variety of interested parties that include other users in the group, merchants, etc. Users may use their user devices to allow check-ins to their user accounts and/or to check-in to other user accounts, and those person-group check-ins will create groups of users that have their individual and group behavior tracked by a system provider device. In particular, the check-in behaviors and spending behaviors of the users in the group may allow for the system provider device to determine how users associate and spend together, which provides the ability to inform merchants how those groups of users may behave at their physical merchant locations, and may be leveraged to bring those groups of users to those physical merchant locations and inform the merchant how those users will behave at a physical merchant location.

Figure 10:
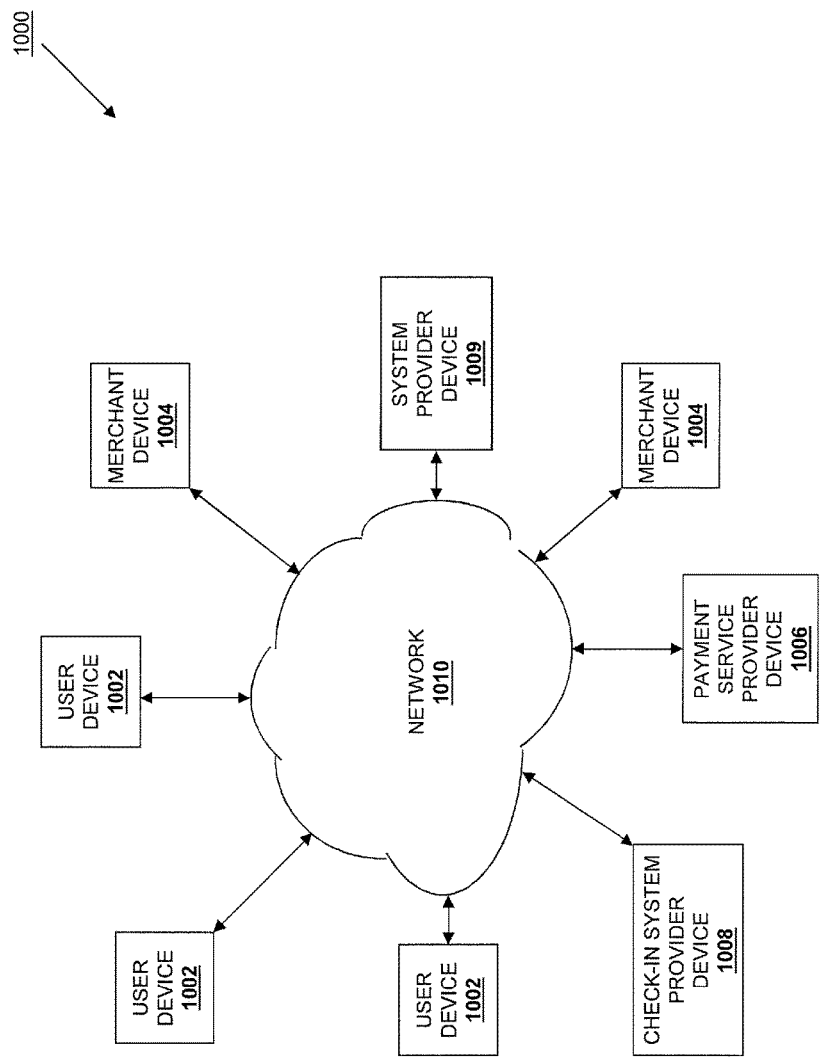
FIG. 10 is a schematic view illustrating an embodiment of a networked system.

Referring now to FIG. 10, an embodiment of a network-based system 1000 for implementing one or more processes described herein is illustrated. As shown, the network-based system 1000 may comprise or implement a plurality of servers and/or software components that operate to perform various methodologies in accordance with the described embodiments. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 10 may be deployed in other ways and that the operations performed and/or the services provided by such servers may be combined or separated for a given implementation and may be performed by a greater number or fewer number of servers. One or more servers may be operated and/or maintained by the same or different entities.

The embodiment of the networked system 1000 illustrated in FIG. 10 includes a plurality of user devices 1002, a plurality of merchant devices 1004, a payment service provider device 1006, a check-in system provider device 1008, and/or a system provider device 1009 in communication over one or more networks 1010. The user devices 1002 may be the user devices discussed above and may be operated by the users discussed above. The merchant devices 1004 may be the merchant devices discussed above and may be operated by the merchants discussed above. The payment service provider device 1006 may be the payment service provider devices discussed above and may be operated by a payment service provider such as, for example, PayPal Inc. of San Jose, Calif. The check-in system provider device 1008 may be the check-in system provider devices discussed above and may be operated by the check-in system providers discussed above. The system provider devices 1009 may be the system provider devices discussed above and may be operated by the system providers discussed above.

The user devices 1002, merchant devices 1004, payment service provider device 1006, check-in system provider device 1008, and/or system provider device 1009 may each include one or more processors, memories, and other appropriate components for executing instructions such as program code and/or data stored on one or more computer readable mediums to implement the various applications, data, and steps described herein. For example, such instructions may be stored in one or more computer readable mediums such as memories or data storage devices internal and/or external to various components of the system 1000, and/or accessible over the network 1010.

The network 1010 may be implemented as a single network or a combination of multiple networks. For example, in various embodiments, the network 1010 may include the Internet and/or one or more intranets, landline networks, wireless networks, and/or other appropriate types of networks.

The user devices 1002 may be implemented using any appropriate combination of hardware and/or software configured for wired and/or wireless communication over network 1010. For example, in one embodiment, the user devices 1002 may be implemented as a personal computer of a user in communication with the Internet. In other embodiments, the user devices 1002 may be a smart phone, personal digital assistant (PDA), laptop computer, and/or other types of computing devices.

The user devices 1002 may include one or more browser applications which may be used, for example, to provide a convenient interface to permit the user to browse information available over the network 1010. For example, in one embodiment, the browser application may be implemented as a web browser configured to view information available over the Internet.

The user devices 1002 may also include one or more toolbar applications which may be used, for example, to provide user-side processing for performing desired tasks in response to operations selected by the user. In one embodiment, the toolbar application may display a user interface in connection with the browser application.

The user devices 1002 may further include other applications as may be desired in particular embodiments to provide desired features to the user devices 1002. In particular, the other applications may include a payment application for payments assisted by a payment service provider through the payment service provider device 1006. The other applications may also include security applications for implementing user-side security features, programmatic user applications for interfacing with appropriate application programming interfaces (APIs) over the network 1010, or other types of applications. Email and/or text applications may also be included, which allow user payer to send and receive emails and/or text messages through the network 1010. The user devices 1002 includes one or more user and/or device identifiers which may be implemented, for example, as operating system registry entries, cookies associated with the browser application, identifiers associated with hardware of the user devices 1002, or other appropriate identifiers, such as a phone number. In one embodiment, the user identifier may be used by the payment service provider device 1006 to associate the user with a particular account as further described herein.

The merchant devices 1004 may be maintained, for example, by a conventional or on-line merchant, conventional or digital goods seller, individual seller, and/or application developer offering various products and/or services in exchange for payment to be received conventionally or over the network 1010. In this regard, the merchant devices 1004 may include a database identifying available products and/or services (e.g., collectively referred to as items) which may be made available for viewing and purchase by the user.

The merchant devices 1004 also include a checkout application which may be configured to facilitate the purchase by the payer of items. The checkout application may be configured to accept payment information from the user through the user devices 1002 and/or from the payment service provider through the payment service provider device 1006 over the network 1010.

Figure 11:
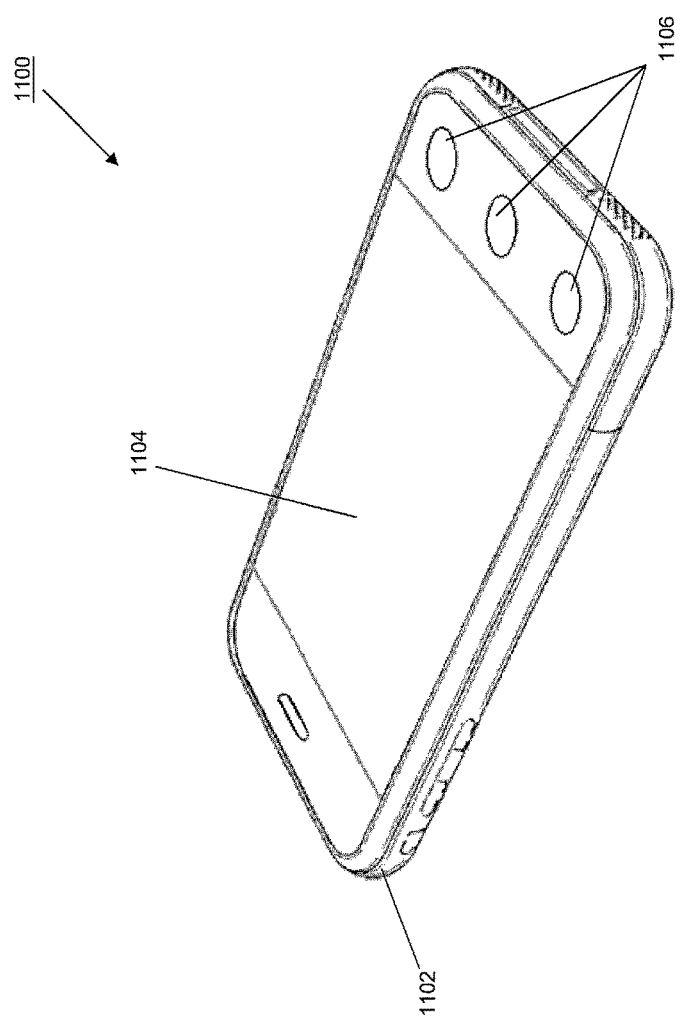
FIG. 11 is a perspective view illustrating an embodiment of a user device.

Referring now to FIG. 11, an embodiment of a user device 1100 is illustrated. The user device 1100 may be any of the user devices discussed above. The user device 1100 includes a chassis 1102 having a display 1104 and an input device including the display 1104 and a plurality of input buttons 1106. One of skill in the art will recognize that the user device 1100 is a portable or mobile phone including a touch screen input device and a plurality of input buttons that allow the functionality discussed above with reference to the methods above. However, a variety of other portable/mobile user devices and/or desktop user devices may be used in the methods discussed above without departing from the scope of the present disclosure.

Figure 12:
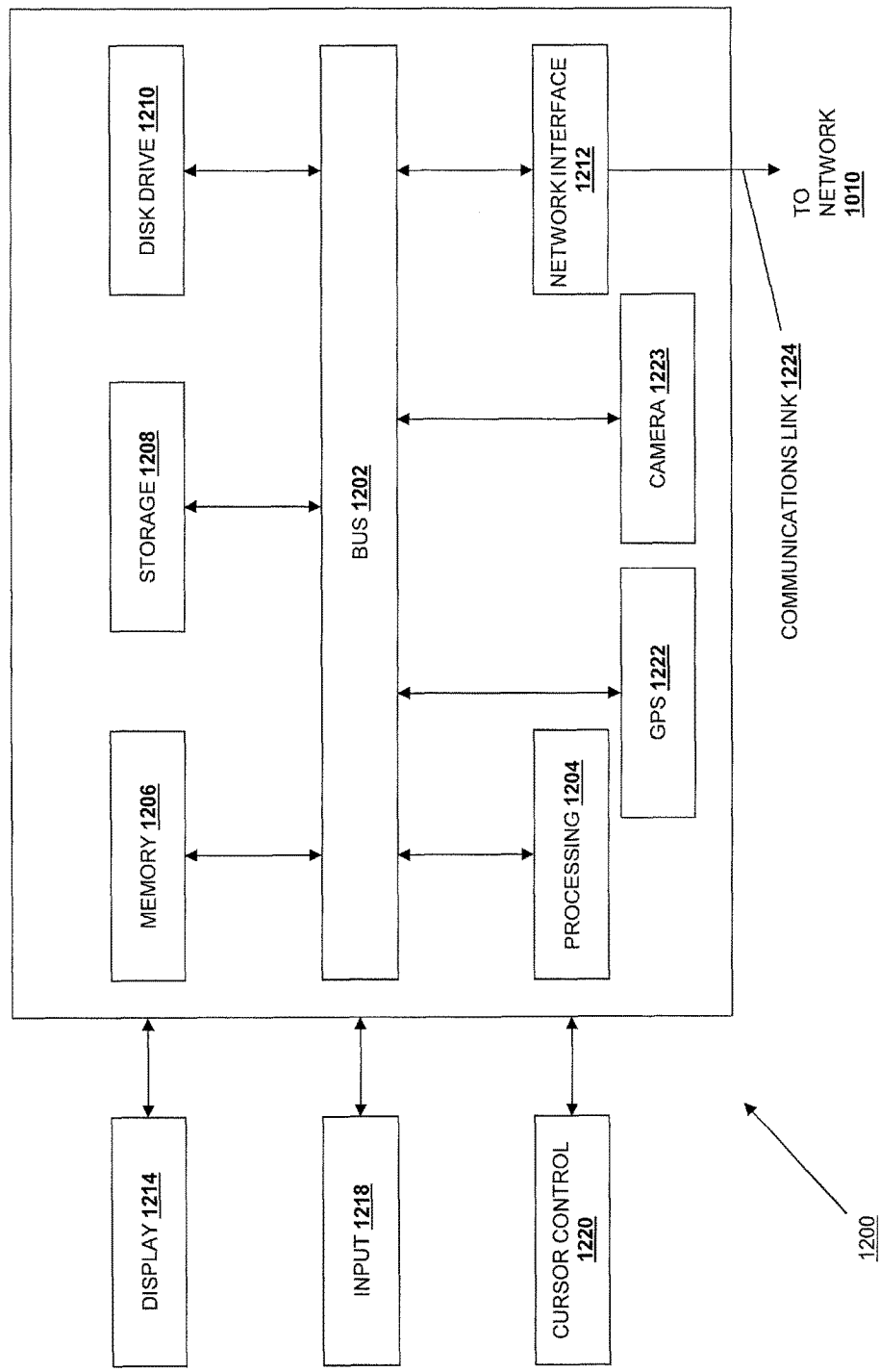
FIG. 12 is a schematic view illustrating an embodiment of a computer system.

Referring now to FIG. 12, an embodiment of a computer system 1200 suitable for implementing, for example, any of the user devices, merchant devices, payment service provider devices, check-in system provider devices, and/or system provider devices, discussed above, is illustrated. It should be appreciated that other devices utilized by users, merchants, payment service providers, check-in system providers, and/or system providers in the system discussed above may be implemented as the computer system 1200 in a manner as follows.

In accordance with various embodiments of the present disclosure, computer system 1200, such as a computer and/or a network server, includes a bus 1202 or other communication mechanism for communicating information, which interconnects subsystems and components, such as a processing component 1204 (e.g., processor, micro-controller, digital signal processor (DSP), etc.), a system memory component 1206 (e.g., RAM), a static storage component 1208 (e.g., ROM), a disk drive component 1210 (e.g., magnetic or optical), a network interface component 1212 (e.g., modem or Ethernet card), a display component 1214 (e.g., CRT or LCD), an input component 1218 (e.g., keyboard, keypad, or virtual keyboard), a cursor control component 1220 (e.g., mouse, pointer, or trackball), a location determination component 1222 (e.g., a Global Positioning System (GPS) device as illustrated, a cell tower triangulation device, and/or a variety of other location determination devices known in the art), and/or a camera component 1223. In one implementation, the disk drive component 1210 may comprise a database having one or more disk drive components.

In accordance with embodiments of the present disclosure, the computer system 1200 performs specific operations by the processor 1204 executing one or more sequences of instructions contained in the memory component 1206, such as described herein with respect to the user devices, merchant devices, payment service provider devices, check-in system provider devices, and/or system provider devices. Such instructions may be read into the system memory component 1206 from another computer readable medium, such as the static storage component 1208 or the disk drive component 1210. In other embodiments, hard-wired circuitry may be used in place of or in combination with software instructions to implement the present disclosure.

Logic may be encoded in a computer readable medium, which may refer to any medium that participates in providing instructions to the processor 1204 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 1210, volatile media includes dynamic memory, such as the system memory component 1206, and transmission media includes coaxial cables, copper wire, and fiber optics, including wires that comprise the bus 1202. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the present disclosure, execution of instruction sequences to practice the present disclosure may be performed by the computer system 1200. In various other embodiments of the present disclosure, a plurality of the computer systems 1200 coupled by a communication link 1224 to the network 1010 (e.g., such as a LAN, WLAN, PTSN, and/or various other wired or wireless networks, including telecommunications, mobile, and cellular phone networks) may perform instruction sequences to practice the present disclosure in coordination with one another.

The computer system 1200 may transmit and receive messages, data, information and instructions, including one or more programs (i.e., application code) through the communication link 1224 and the network interface component 1212. The network interface component 1212 may include an antenna, either separate or integrated, to enable transmission and reception via the communication link 1224. Received program code may be executed by processor 1204 as received and/or stored in disk drive component 1210 or some other non-volatile storage component for execution.

Figure 13:
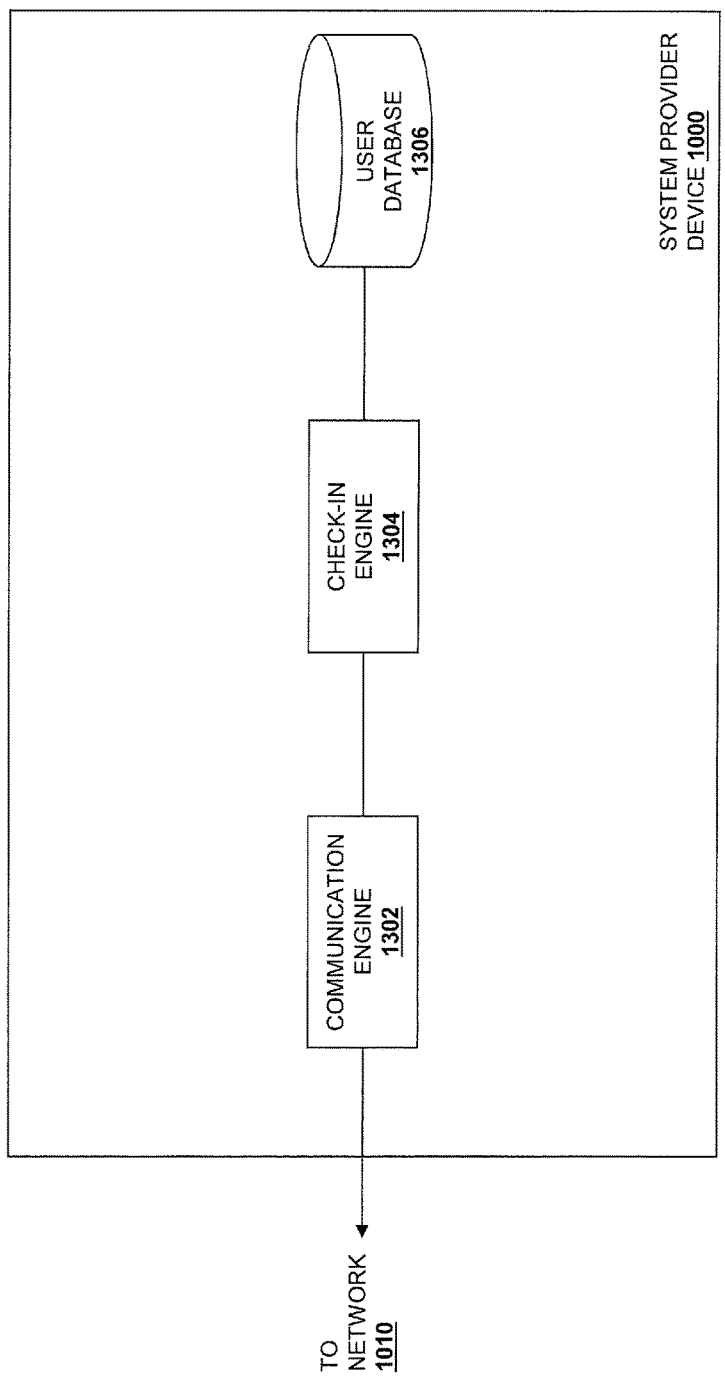
FIG. 13 is a schematic view illustrating an embodiment of a system provider device.

Referring now to FIG. 13, an embodiment of a system provider device 1300 is illustrated. In an embodiment, the device 1300 may be any of the system provider devices discussed above. The device 1300 includes a communication engine 1302 that is coupled to the network 1010 and to a check-in engine 1304 that is coupled to a user database 1306. The communication engine 1302 may be software or instructions stored on a computer-readable medium that allows the device 1300 to send and receive information over the network 1010. The check-in engine 1304 may be software or instructions stored on a computer-readable medium that is operable to receive check-in requests to allow check-ins to a user account, receive check-in requests to check-in to user accounts, associate user accounts in the user database 1306, track aggregate behavior of associated accounts, send spending alerts, as well as provide any of the other functionality that is discussed above. While the database 1306 has been illustrated as a single database located in the device 1300, one of skill in the art will recognize that it may include multiple databases, any of which may be connected to the check-in engine 1304 through the network 1010 without departing from the scope of the present disclosure.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, the above embodiments have focused on merchants and users; however, a user or consumer can pay, or otherwise interact with any type of recipient, including charities and individuals. The payment does not have to involve a purchase, but may be a loan, a charitable contribution, a gift, etc. Thus, merchant as used herein can also include charities, individuals, and any other entity or person receiving a payment from a user. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A person/group check-in system, comprising:
a non-transitory memory storing a plurality of user accounts; and
one or more hardware processors configured to execute instructions to cause the system to perform operations comprising:
receiving, through a network from a first check-in application running on a first user device that is associated with a first user account of the plurality of user accounts, a first check-in request to allow a second user account of the plurality of user accounts to check-in to the first user account;

receiving, through the network from the first check-in application running on the first user device, first user device location data during each of a plurality of different time periods;

receiving, through the network from a second check-in application running on a second user device that is associated with the second user account of the plurality of user accounts, a second check-in request to check-in to the first user account;

receiving, through the network from the second check-in application running on the second user device, second user device location data during each of the plurality of different time periods;

beginning, based on the first check-in request to allow the second user account to check into the first user account and in response to receiving the second check-in request while the first user device location data and the second user device location data indicate that the first user device and the second user device are co-located during a first time period of the plurality of different time periods, an association between the first user account and the second user account in the non-transitory memory;

maintaining the association between the first user account and the second user account in response to the first user device location data and the second user device location data indicating that the first user device and the second user device are co-located during at least one second time period of the plurality of different time periods that is subsequent to the first time period;

tracking, through the network while the association between the first user account and the second user account is maintained in response to the first user device and the second user device being co-located, an aggregate spending behavior that is generated in response to respective transactions with each of a plurality of different merchants and both the first user account and the second user account;

providing, through the network, at least one alert that is based on the aggregate spending behavior;

determining that the first user device location data and the second user device location data indicate that the first user device and the second user device are no longer co-located during a third time period of the plurality of different time periods that is subsequent to the at least one second time period; and disassociating, in response to determining that the first user device and the second user device are no longer co-located, the first user account and the second user account.

2. The system of claim 1, wherein the operations further comprise:

receiving, through the network from a third check-in application running on a third user device that is associated with a third user account of the plurality of user accounts, a third check-in request to check-in to at least one of the first user account or the second user account;

receiving, through the network from the third check-in application running on the third user device, third user device location data during each of the plurality of different time periods;

beginning, in response to receiving the third check-in request while the third user device location data and at least one of the first user device location data or the second user device location data indicate that the third user device is co-located with at least one of the first user device and the second user device during the at least one second first time period of the plurality of different time periods, an association between the third user account and at least one of the first user account or the second user account in the non-transitory memory;

maintaining the association between the third user account and the at least one of the first user account or the second user account in response to the third user device location data and at least one of the first user device location data or the second user device location data indicating that the third user device and at least one of the first user device or the second user device are co-located during at least one fourth time period of the plurality of different time periods;

tracking, through the network while the association between the third user account and the at least one of the first user account or the second user account is maintained in response to the third user device and at least one of the first user device or the second user device being co-located, the aggregate spending behavior that is generated in response to respective transactions with each of the plurality of merchants and each of the first user account, the second user account, and the third user account; and providing, through the network, the at least one alert that is based on the aggregate spending behavior.

3. The system of claim 1, wherein the operations further comprise:

determining that the first user device location data and the second user device location data indicate that the first user device and the second user device are co-located during the first time period and the at least one second time period of the plurality of different time periods in response to determining, during the first time period and the at least one second time period, that the first user device location data indicate a first user device location that is within a predetermined distance of a second user device location indicated by the second user device location data.

4. The system of claim 1, wherein the operations further comprise:

receiving, through the network from the first check-in application running on the first user device, a first group fund request to transfer funds associated with the first user account to a group fund;

receiving, through the network from the second check-in application running on the second user device, a second group fund request to transfer funds associated with the second user account to the group fund;

transferring funds associated with the first user account and the second user account to the group fund; and transferring funds associated with the group fund to a merchant account in response to at least one purchase action associated with at least one of the first user device or the second user device.

5. The system of claim 1, wherein the at least one alert includes a spending alert that is sent through the network to the second check-in application running on the second user device in response to detecting a purchase attempt associated with the first user account during the at least one second time period while the first user device and the second user device are co-located.

6. The system of claim 1, wherein the operations further comprise:

identifying, using the first user device location data and the second user device location data received, a first merchant of the plurality of merchants that is co-located with the first user device and the second user device during at least one of the first time period or the at least one second time period of the plurality of different time periods; and associating the first merchant with the aggregate spending behavior, wherein the at least one alert includes an alert that is sent to a merchant device and includes an amount spent with the first merchant using both the first user account and the second user account.

7. A method for providing person/group check-ins, comprising:

receiving, through a network by a system provider device from a first system provider application running on a first user device that is associated with a first user account, a first check-in request to allow a second user account to check-in to the first user account;

receiving, through the network by the system provider device from the first system provider application running on the first user device, first user device location data during each of a plurality of different time periods;

receiving, through the network by the system provider device from a second system provider application running on a second user device that is associated with the second user account, a second check-in request to check-in to the first user account;

receiving, through the network by the system provider device from the second system provider application running on the second user device, second user device location data during each of the plurality of different time periods;

beginning, by the system provider device based on the first check-in request to allow the second user account to check-in to the first user account and in response to receiving the second check-in request while the first user device location data and the second user device location data indicate that the first user device and the second user device are co-located during a first time period of the plurality of different time periods, an association between the first user account and the second user account stored in a database;

maintaining the association between the first user account and the second user account in response to the first user device location data and the second user device location data indicating that the first user device and the second user device are co-located during at least one second time period of the plurality of different time periods that is subsequent to the first time period;

tracking, through the network by the system provider device while the association between the first user account and the second user account is maintained in response to the first user device and the second user device being co-located, an aggregate spending behavior that is generated in response to respective transactions with each of a plurality of merchants and both the first user account and the second user account;

providing, through the network by the system provider device, at least one alert that is based on the aggregate spending behavior;

determining, by the system provider device, that the first user device location data and the second user device location data indicate that the first user device and the second user device are no longer co-located during a third time period of the plurality of different time periods that is subsequent to the at least one second time period; and disassociating, by the system provider device in response to determining that the first user device and the second user device are no longer co-located, the first user account and the second user account.

8. The method of claim 7, further comprising:

receiving, through the network by the system provider device from a third system provider application running on a third user device that is associated with a third user account, a third check-in request to check-in to at least one of the first user account or the second user account, wherein the third check-in request is associated with a third user account of the plurality of user accounts;

receiving, through the network by the system provider device from the third check-in application running on the third user device, third user device location data during each of the plurality of different time periods;

beginning, by the system provider device in response to receiving the third check-in request while the third user device location data and at least one of the first user device location data or the second user device location data indicates that the third user device and at least one of the first user device or the second user device are co-located during the at least one second time period of the plurality of different time periods, an association between the third user account and at least one of the first user account or the second user account stored in the database;

maintaining the association between the third user account and the at least one of the first user account or the second user account in response to the third user device location data and at least one of the first user device location data or the second user device location data indicating that the third user device and at least one of the first user device or the second user device are co-located during at least one fourth time period of the plurality of different time periods;

tracking, through the network by the system provider device while the association between the third user account and the at least one of the first user account or the second user account is maintained in response to the third user device and at least one of the first user device or the second user device being co-located, the aggregate spending behavior that is generated in response to respective transactions with each of the plurality of merchants and each of the first user account, the second user account, and the third user account; and providing, through the network by the system provider device, the at least one alert that is based on the aggregate spending behavior.

9. The method of claim 7, further comprising:

determining, by the system provider device, that the first user device location data and the second user device location data indicate that the first user device and the second user device are co-located during the first time period and the at least one second time period of the plurality of different time periods in response to determining, by the system provider device during the first time period and the at least one second time period, that the first user device location data indicate a first user device location that is within a predetermined distance of a second user device location indicated by the second user device location data.

10. The method of claim 7, further comprising:

receiving, through the network by the system provider device from the first system provider application running on the first user device, a first group fund request to transfer funds associated with the first user account to a group fund;

receiving, through the network by the system provider device from the second system provider application running on the second user device, a second group fund request to transfer funds associated with the second user account to the group fund;

transferring, by the system provider device, funds associated with the first user account and the second user account to the group fund; and transferring, by the system provider device, funds associated with the group fund to a merchant account in response to at least one purchase action associated with at least one of the first user device or the second user device.

11. The method of claim 7, wherein the at least one alert includes a spending alert that is sent through the network to the second system provider application running on the second user device in response to detecting a purchase attempt associated with the first user account during the at least one second time period while the first user device and the second user device are co-located.

12. The method of claim 7, further comprising:
identifying, by the system provider device using the first user device location data and the second user device location data, a first merchant of the plurality of merchants that is co-located with the first user device and the second user device during at least one of the first time period or the at least one second time period of the plurality of different time periods; and
associating the first merchant with the aggregate spending behavior, wherein the at least one alert includes an alert that is sent to a first merchant device of the first merchant and includes an amount spent with the first merchant using both the first user account and the second user account.

13. The method of claim 12, further comprising:
associating, by the system provider device, the aggregate spending behavior with the first user account stored in the database; and
providing, through the network by the system provider device, the aggregate spending behavior to the first merchant device of the first merchant along with a group discount request.

14. A non-transitory machine-readable medium having stored thereon machine-readable instructions executable to cause a machine to perform operations comprising:
receiving, through the network from a first device application running on a first user device that is associated with a first user account, a first check-in request to allow a second user account to check-in to the first user account;
receiving, through the network from the first device application running on the first user device, first user device location data during each of a plurality of different time periods;
receiving, through the network from a second device application running on a second user device that is associated with the second user account, a second check-in request to check-in to the first user account;
receiving, through the network from the second device application running on the second user device, second user device location data during each of the plurality of different time periods;
beginning, based on the first check-in request to allow the second user account to check-in to the first user account and in response to receiving the second check-in request while the first user device location data and the second user device location data indicate that the first user device and the second user device are co-located during a first time period of the plurality of different time periods, an association between the first user account and the second user account stored in a database;
receiving, through the network from the first device application running on the first user device, first user device location coordinates during each of a plurality of different time periods;
receiving, through the network from the second device application running on the second user device, second user device location coordinates during each of the plurality of different time periods;
maintaining the association between the first user account and the second user account in response to the first user device location data and the second user device location data indicating that the first user device and the second user device are co-located during at least one second time period of the plurality of different time periods that is subsequent to the first time period;
tracking, through the network while the association between the first user account and the second user account is maintained in response to the first user device and the second user device being co-located, an aggregate spending behavior that is generated in response to respective transactions with each a plurality of merchants and both the first user account and the second user account;
providing, through the network, at least one alert that is based on the aggregate spending behavior;
determining that the first user device location data and the second user device location data indicate that the first user device and the second user device are no longer co-located during a third time period of the plurality of different time periods that is subsequent to the at least one second time period; and
disassociating, in response to determining that the first user device and the second user device are no longer co-located, the first user account and the second user account.

15. The non-transitory machine-readable medium of claim 14, wherein the operations further comprise:
receiving, through the network from a third check-in application running on a third user device that is associated with a third user account of the plurality of user accounts, a third check-in request, to check-in to at least one of the first user account or the second user account;
receiving, through the network from the third check-in application running on the third user device, third user device location data during each of the plurality of different time periods;
beginning, in response to receiving the third check-in request while the third user device location data and at least one of the first user device location data and the second user device location data indicate that the third user device and at least one of the first user device and the second user device are co-located during the at least one second time period of the plurality of different time periods, an association between the third user account and at least one of the first user account and the second user account in the database;
maintaining the association between the third user account and the at least one of the first user account or the second user account in response to the third user device location data and at least one of the first user device location data or the second user device location data indicating that the third user device and at least one of the first user device or the second user device are co-located during at least one fourth time period of the plurality of different time periods;

tracking, through the network while the association between the third user account and the at least one of the first user account or the second user account is maintained in response to the third user device and at least one of the first user device or the second user device between co-located, the aggregate spending behavior that is generated in response to respective transactions with each of the plurality of merchants and each of the first user account, the second user account, and the third user account; and providing, through the network, the at least one alert that is based on the aggregate spending behavior.

16. The non-transitory machine-readable medium of claim 14, wherein the operations further comprise:

data and the second user device location data indicate that the first user device and the second user device are co-located during the first time period and the at least one second time period of the plurality of different time periods in response to determining, during the first time period and the at least one second time period, that the first user device location data indicate a first user device location that is within a predetermined distance of a second user device location indicated by the second user device location data.

17. The non-transitory machine-readable medium of claim 14, wherein the operations further comprise:

receiving, through the network from the first device application running on the first user device, a first group fund request to transfer funds associated with the first user account to a group fund;

receiving, through the network from the second device application running on the second user device, a second group fund request to transfer funds associated with the second user account to the group fund;

transferring funds associated with the first user account and the second user account to the group fund; and transferring funds associated with the group fund to a merchant account in response to at least one purchase action associated with at least one of the first user device or the second user device.

18. The non-transitory machine-readable medium of claim 14, wherein the at least one spending alert includes a spending alert that is sent through the network to the second device application running on the second user device in response to a purchase attempt associated with the first user account during the at least one second time period while the first user device and the second user device are co-located.

19. The non-transitory machine-readable medium of claim 18, wherein the operations further comprise:

identifying, using the first user device location data and the second user device location data received a first merchant of the plurality of merchants that is co-located with the first user device and the second user device during at least one of the first time period or the at least one second time period; and associating the first merchant with the aggregate spending behavior, wherein the at least one alert includes an alert that is sent to a first merchant device of the first merchant and includes an amount spent with the first merchant using both the first user account and the second user account.

20. The non-transitory machine-readable medium of claim 14, wherein the operations further comprise:

associating the aggregate spending behavior with the first user account; and providing, through the network, the aggregate behavior to the merchant device of the first merchant along with a group discount request.

\* \* \* \* \*